(12) United States Patent
DeSalvo et al.

(10) Patent No.: US 11,320,527 B1
(45) Date of Patent: May 3, 2022

(54) DEVICES, SYSTEMS, AND METHODS FOR RADAR-BASED ARTIFICIAL REALITY TRACKING

(71) Applicant: Facebook Technologies, LLC, Menlo Park, CA (US)

(72) Inventors: Riccardo DeSalvo, Los Angeles, CA (US); Giuseppe Castaldi, Apice (IT); Andrea Cusano, Caserta (IT); Vincenzo Galdi, Benevento (IT); Paolo Mattera, Benevento (IT); Roberto Parente, Cerreto Sannita (IT); Fereydoun Daneshgaran, La Crescenta, CA (US); Joseph Minh Tien, Alhambra, CA (US); Dustin Jeffery Gordon Krogstad, Chino, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 263 days.

(21) Appl. No.: 16/722,068

(22) Filed: Dec. 20, 2019

(51) Int. Cl.
| | |
|---|---|
| *G01S 13/34* | (2006.01) |
| *G01S 13/88* | (2006.01) |
| *G01S 13/12* | (2006.01) |
| *G06F 3/01* | (2006.01) |
| *G02B 27/01* | (2006.01) |

(52) U.S. Cl.
CPC ............ *G01S 13/341* (2013.01); *G01S 13/12* (2013.01); *G01S 13/88* (2013.01); *G02B 27/017* (2013.01); *G06F 3/011* (2013.01)

(58) Field of Classification Search
CPC ...... G01S 13/10; G01S 13/581; G01S 13/874; G01S 15/10; G01S 15/582; G01S 15/872; G01S 17/10; G01S 17/58; G01S 17/875; G01S 13/34; G01S 13/767; G01S 13/82; G01S 13/88; G01S 17/88; G01S 3/8083; G01S 7/023; G01S 7/0232; G01S 7/36
See application file for complete search history.

(56) References Cited

U.S. PATENT DOCUMENTS

| | | | |
|---|---|---|---|
| 2005/0200515 A1* | 9/2005 | Cherniakov | .......... G01S 13/767 342/51 |
| 2018/0095172 A1* | 4/2018 | Casagrande | .......... G01S 13/825 |
| 2018/0306913 A1* | 10/2018 | Bartels | ...................... G01S 7/03 |

(Continued)

*Primary Examiner* — Timothy X Pham
(74) *Attorney, Agent, or Firm* — FisherBroyles, LLP

(57) ABSTRACT

The disclosed radar system may include a radar mechanism comprising a transmitter and at least one receiver. The radar system may also include a signal generator that generates a frequency-modulated radar signal. In addition, the radar system may include a delay mechanism that (1) receives the frequency-modulated radar signal from the signal generator and (2) after a certain period of delay, passes the frequency-modulated radar signal to the transmitter to be transmitted to a transponder located on a wearable artificial reality device. The radar system may also include a processing device that (1) receives the frequency-modulated radar signal from the signal generator, (2) detects a signal returned to the receiver from the transponder, and (3) calculates a distance between the transponder and the receiver based at least in part on an analysis of the signal returned from the transponder and the frequency-modulated radar signal received from the signal generator.

18 Claims, 18 Drawing Sheets

(56) References Cited

U.S. PATENT DOCUMENTS

| | | | |
|---|---|---|---|
| 2020/0116844 A1* | 4/2020 | McLaughlin | G01S 7/52095 |
| 2021/0018623 A1* | 1/2021 | Yang | G01S 7/4863 |
| 2021/0096217 A1* | 4/2021 | Jadidian | G01S 13/30 |

* cited by examiner

DEVICES, SYSTEMS, AND METHODS FOR RADAR-BASED ARTIFICIAL REALITY TRACKING

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
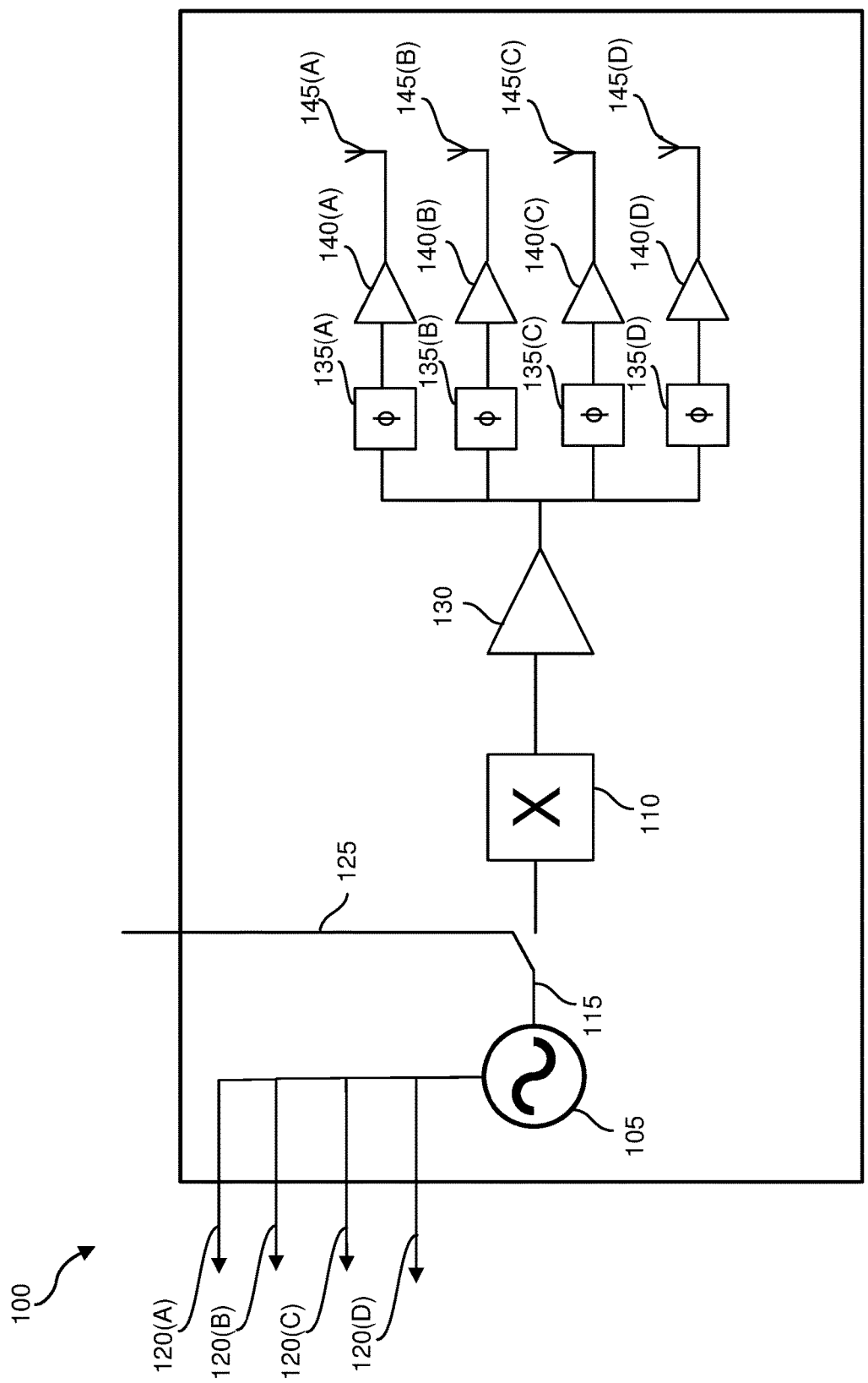
FIG. 1 is an illustration of an exemplary apparatus that may be used in connection with embodiments of this disclosure.

While the exemplary embodiments described herein are susceptible to various modifications and alternative forms, specific embodiments have been shown by way of example in the background and will be described in detail herein. However, the exemplary embodiments described herein are not intended to be limited to the particular forms disclosed. Rather, the instant disclosure covers all modifications, combinations, equivalents, and alternatives falling within this disclosure

DETAILED DESCRIPTION OF EXEMPLARY EMBODIMENTS

Over the last several years, artificial reality systems have revolutionized the way people experience various kinds of digital media. For example, an artificial reality headset may allow users to experience realistic, immersive virtual environments while playing video games, during flight simulation training, or even when interacting with co-workers around the globe. In addition to such artificial-reality applications, wearable artificial reality devices may also enable users to augment reality and/or combine certain aspects of reality with those of the virtual world.

Despite significant advances in such technology, traditional artificial reality systems may still have certain deficiencies that negatively impact the overall user experience. For example, some artificial reality systems may struggle to accurately and/or quickly track the position of a user and/or an artificial reality device worn by the user. As such, the artificial reality system may be unable to update virtual content (such as graphics or haptic feedback) with sufficient speed and/or resolution.

The present disclosure, therefore, identifies and addresses a need for additional devices, systems, and methods for radar-based artificial reality tracking. In particular, these devices, systems, and methods may determine the current location of all or a portion of a user by calculating the distance between one or more radar devices and one or more transponders that are located on and/or nearby the user. As will be explained in greater detail below, these devices, systems, and methods may provide numerous features and benefits.

The disclosed radar systems may utilize various types of radar to track or determine the position, orientation, and/or physical location of a wearable artificial reality device and/or a user of an artificial reality system. In particular, the disclosed radar systems may utilize frequency-modulated continuous-wave (FMCW) radar. In an FMCW radar system, a radar device may transmit a frequency-modulated signal (e.g., a signal that sweeps between and/or within a certain range of frequencies). In one embodiment, the frequency of an FMCW signal may vary linearly over a fixed period of time. As an example, the frequency of an FMCW signal may linearly sweep between 120 gigahertz and 130 gigahertz over a time period of 10 milliseconds.

After transmitting an FMCW signal, a radar system may receive a reflected, echoed, or otherwise returned signal from a target that received and/or encountered the FMCW signal. Because the frequency of the FMCW signal changes over time, the instantaneous frequency of the returned signal may differ from the instantaneous frequency of the FMCW signal at the point in time that the returned signal is received at the radar system. For example, the instantaneous frequency of the returned signal may be offset by a certain amount relative to the FMCW signal. This frequency offset may be related to and/or a result of the time required for the FMCW signal to travel from the radar system to the target and back to the radar system. Because the frequency of the FMCW signal has a known rate of change, the radar system may determine the range of (e.g., distance to) the target based at least in part on the frequency offset of the returned signal.

The radar system may identify the frequency offset of the returned signal in a variety of ways. In one embodiment, the radar system may combine (e.g., multiply) the returned signal and the original FMCW signal (which may be referred to as a reference signal). The radar system may then determine the frequency components of the combined signal (which may be referred to as a beat signal). In some examples, the frequency components may include an offset frequency corresponding to the amount by which the frequency of the returned signal has shifted. This offset frequency may be referred to as a beat frequency. In some embodiments, the value of the beat frequency may be directly proportional to the range of the target. Accordingly, extracting the beat frequency from the combined signal may enable the radar system to determine the range of the target.

The disclosed radar systems may determine the range of a variety of types of targets. In one example, a radar system may determine the range of passive targets (e.g., targets that simply reflect signals and do not actively transmit signals). Examples of passive targets may include a body part of a user, a wall, and/or a piece of furniture. In other examples, the disclosed radar systems may determine the range of active targets (e.g., targets that repeat, transmit, and/or modify received signals). Examples of active targets may include repeaters and/or transponders.

Utilizing active targets in addition to or instead of passive targets may provide a variety of benefits and advantages. For example, an active target may be capable of amplifying an FMCW signal before returning the FMCW signal to a radar device, thereby increasing the amplitude and/or improving the quality of the FMCW signal. In addition, an active target (such as a transponder) may generally be smaller in size than a passive target (such as a fingertip). For example, the transponders utilized in the disclosed radar systems may have a diameter of several millimeters. Due to their small and/or finite size, active targets may have a smaller area of reflective surfaces and may therefore provide returned signals with cleaner and/or more precise frequency profiles than passive targets.

Furthermore, a transponder or other active target may return a received FMCW signal that has an intentional (e.g., predetermined) offset frequency. For example, before returning an FMCW signal, a transponder may shift the frequencies of the FMCW signal by a certain amount (e.g., 1 megahertz, 2 megahertz, etc.). Such an intentional frequency offset within a returned signal may enable a radar system to identify a particular transponder that returned the signal (e.g., from within a group of transponders that each shift the frequency of returned signals by a different amount). In addition, an intentional frequency offset may reduce the amount of noise introduced into a returned signal by electromagnetic interference and/or ambient clutter (e.g., objects surrounding a transponder).

The radar systems disclosed herein may track and/or determine the position, orientation, and/or physical location of any type or form of wearable artificial reality device, including headsets, head-mounted displays, helmets, neckbands, wristbands, belts, ankle bands, and/or gloves. In some examples, a radar system may include multiple types of wearable artificial reality devices. For example, a radar system may include a headset worn on a user's head and a glove worn on the user's hand. In this example, the radar system may track changes in the relative distance between the headset and portions of the glove. Specifically, a radar device secured to the headset may periodically determine the distance between the radar device and one or more transponders secured to the glove. Additionally or alternatively, the radar system may determine a location of the glove and/or the headset within a physical environment surrounding the user.

The radar systems disclosed herein may utilize information about the position, orientation and/or physical location of a wearable artificial reality device in a variety of ways. In one example, a radar system may pass information about a current position of the device (or a change in the position of the device) to an artificial reality system to facilitate modifying one or more virtual components of the artificial reality system. Specifically, based on this information, the artificial reality system may adjust the location at which the user perceives a portion of virtual content (such as a graphic or haptic feedback) to account for the current (e.g., updated) position of the wearable artificial reality device. Additionally or alternatively, the artificial reality system may update a remote view of all or a portion of the user as the user is perceived, via radar, within their physical environment.

In some embodiments, the disclosed radar systems may be utilized in applications beyond artificial reality or similar applications (such as virtual reality and/or augmented reality). For example, these radar systems may be utilized in applications involving the control of an apparatus (such as an electronic device, a data input mechanism, a piece of machinery, a vehicle, etc.) using one or more body parts or gestures.

In some examples, a radar system may include multiple transponders. All or a portion of these transponders may be secured to a wearable device worn by a user. For example, an artificial reality glove may include a transponder corresponding to each of a user's fingertips, a transponder corresponding to each of the user's knuckles, and additional transponders corresponding to various locations on the user's hands, palms, and/or fingers. Incorporating a large number of transponders into a wearable device may increase the resolution with which an artificial reality system is capable of tracking the posture of a user's limbs and/or detailed movements of the wearable device.

Similarly, a radar system may include multiple radar devices. For example, the radar system may include at least one radar transmitter that transmits frequency-modulated radar signals. The radar system may also include at least one radar receiver that receives signals returned from transponders in response to frequency-modulated radar signals. In some embodiments, the radar devices within a radar system may be secured to a wearable device worn by a user (e.g., a different wearable device than the device that secures a set of transponders). Additionally or alternatively, the radar devices may be secured at a stationary location within the physical environment surrounding the user. In one example, a radar system may include a radar device that has one transmitter and multiple receivers. These components may be secured in any pattern and/or configuration that facilitates three-dimensional localization of a transponder. For example, the radar system may include an artificial reality headset equipped with a centrally-located transmitter and three or more receivers surrounding the transmitter (e.g., the receivers may be located near each of the user's ears and near the back of the user's head).

In some examples, the disclosed radar systems may delay transmitting a frequency-modulated radar signal. For example, a radar system may offset transmission of the radar signal to a set of transponders by a certain amount of time relative to passing the radar signal to one or more receiver-coupled devices to be used as a reference signal. In this way, the instantaneous frequency of the transmitted radar signal may be offset from the instantaneous frequency of the reference signal by a certain amount. Specifically, the frequency of the transmitted radar signal may be less than the frequency of the reference signal. This frequency offset may produce a corresponding frequency offset within a beat frequency calculated based on the reference signal. For example, the calculated beat frequency may be higher than a beat frequency that corresponds to the actual range of a transponder. The radar system may account for this frequency offset when determining the actual range of the transponder.

In some embodiments, intentionally increasing a beat frequency may facilitate more efficient and/or more accurate ranging. For example, a radar system may implement a zero-crossing technique to determine the beat frequency. This technique may involve directly measuring the period of a beat signal (e.g., instead of performing a frequency spectrum analysis on the beat signal). Because a high-frequency signal may have a shorter period than a low-frequency signal, measuring a higher beat frequency may be faster than measuring a lower beat frequency. In some embodiments, this faster analysis process may reduce both the amount of power consumed by the radar system and the operational frequency bandwidth of the radar system. Moreover, some traditional radar systems may be unable to accurately determine the range of nearby transponders (e.g., due to the value of a beat frequency approaching zero as the range of a target approaches zero). Thus, intentionally increasing the beat frequency (such that the target appears farther away) may facilitate accurate localization at close distances.

The following will provide, with reference to FIGS. 1, 3-6, and 9, detailed descriptions of exemplary systems and apparatuses that may facilitate radar-based artificial reality tracking. Detailed descriptions of exemplary frequency ramps will be provided in connection with FIGS. 2 and 7. Detailed descriptions of exemplary artificial reality devices and artificial reality environments that may be used in connection with the disclosed embodiments will be provided in connection with FIGS. 8 and 10-12. Detailed descriptions of corresponding computer-implemented methods will be provided in connection with FIG. 13. Finally, detailed descriptions of exemplary augmented or virtual reality devices that may be used with embodiments of this disclosure will be provided in connection with FIGS. 14-18.

FIG. 1 is an illustration of an exemplary apparatus 100 for radar-based artificial reality tracking. In some examples, apparatus 100 may include and/or represent an integrated circuit, a printed circuit board (PCB), a chip, or similar device. Apparatus 100 may be part of and/or included within a radar system and/or an artificial reality system. For example, one or more instances of apparatus 100 may be secured to a wearable artificial reality device worn by a user to facilitate tracking the physical location of all or a portion of the user via FMCW radar.

Apparatus 100 may include one or more transmitters, such as transmitters 145(A)-(D). In some embodiments, the term "transmitter" may refer to any type or form of antenna that emits, distributes, or otherwise transmits a signal. In one example, one or more of transmitters 145(A)-(D) may transmit a frequency-modulated radar signal to facilitate ranging a set of transponders secured to a wearable artificial reality device. The frequency-modulated radar signals transmitted by transmitters 145(A)-(D) may be at least partially generated by a signal generator 105. Signal generator 105 generally represents any type or form of waveform generator, function generator, clock, oscillator, or similar device capable of outputting a frequency-modulated signal. In one embodiment, signal generator 105 may include and/or represent a voltage-controlled oscillator (VCO).

Signal generator 105 may generate a variety of types of frequency-modulated radar signals. In some examples, signal generator 105 may generate a signal whose frequency follows and/or is defined by a frequency ramp. In one embodiment, a frequency ramp may represent and/or correspond to a linear (or approximately linear) sweep from one frequency to a second frequency over a fixed period of time. As an example, signal generator 105 may generate a frequency ramp that sweeps from 119 gigahertz to 127 gigahertz over a period of 8 milliseconds. This frequency ramp may then repeat (e.g., continuously or for a certain number of cycles) after reaching 127 gigahertz.

In some embodiments, signal generator 105 may generate a radar signal whose frequency is lower (e.g., by a factor of 10, a factor of 15, etc.) than the frequency of the radar signal that is ultimately transmitted by transmitters 145(A)-(D). In these embodiments, apparatus 100 may include one or more components (such as a frequency multiplier 110) that increase the frequency of the signal generated by signal generator 105 to the desired frequency before the signal is transmitted. Frequency multiplier 110 generally represents any type or form of device and/or circuit whose output frequency is a harmonic (e.g., a multiple) of its input frequency. Frequency multiplier 110 may multiply the frequency of received signals by any suitable and/or selected factor, including a factor smaller than 1 (e.g., frequency multiplier 110 may decrease the frequency of received signals).

In one embodiment, signal generator 105 may pass a frequency-modulated radar signal directly to frequency multiplier 110 (e.g., via a transmission path 115). In this embodiment, transmission path 115 may carry the radar signal to frequency multiplier 110 immediately (e.g., with no or minimal delay). In other embodiments, signal generator 105 may pass the radar signal to one or more intermediate components of a radar system (e.g., components external to apparatus 100) before frequency multiplier 110 receives the radar signal. For example, signal generator 105 may pass the radar signal to a delay mechanism via a transmission path 120(A). After introducing a certain period of delay into the radar signal, the delay mechanism may pass the radar signal to frequency multiplier 110 via a transmission path 125. In one example, apparatus 100 may include one of transmission paths 115 and 125. In other examples, apparatus 100 may include both transmission paths 115 and 125, as well as a switch that may be set to connect either transmission path 115 or transmission path 125 to frequency multiplier 110.

Figure 2:
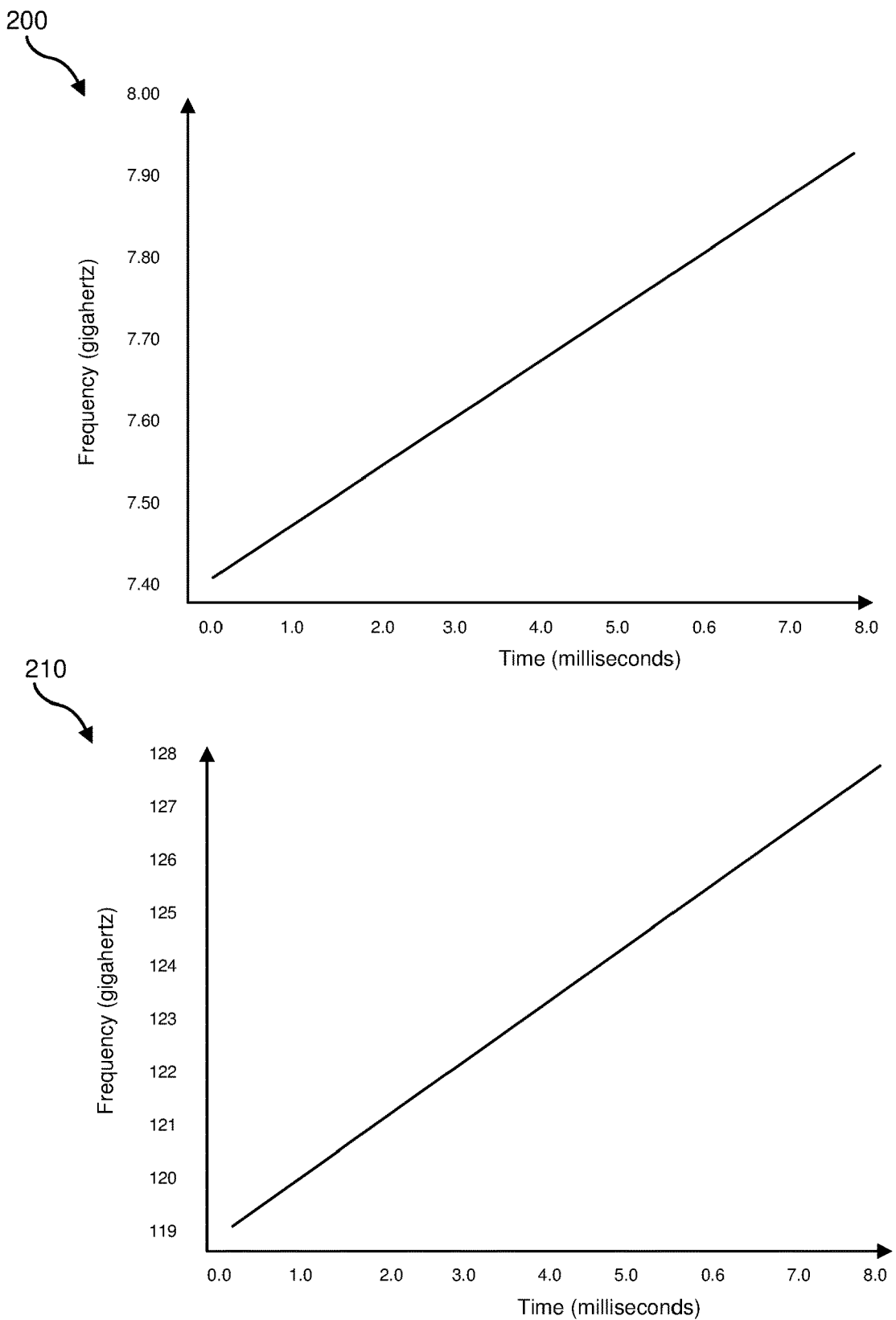
FIG. 2 is an illustration of exemplary frequency ramps.

Once the radar signal is received at frequency multiplier 110 (e.g., either via transmission path 115 or transmission path 125), frequency multiplier 110 may multiply the radar signal by a certain factor. FIG. 2 illustrates an exemplary frequency-modulated radar signal before and after the radar signal is processed by frequency multiplier 110. In this example, a plot 200 illustrates a frequency ramp generated by signal generator 105. As shown in FIG. 2, the frequency of this ramp may increase linearly from 7.44 gigahertz to 7.94 gigahertz over a time period of 8 milliseconds. A plot 210 of FIG. 2 illustrates the frequency of the ramp after it is passed through frequency multiplier 110. In one example, frequency multiplier 110 may multiply the frequency of received signals by a factor of 16. Accordingly, plot 210 illustrates a ramp whose frequency increases from 119 gigahertz to 127 gigahertz over 8 milliseconds.

In some embodiments, frequency multiplier 110 may pass the radar signal (with the increased frequency) directly to one or more of transmitters 145(A)-(D) to be transmitted. Alternatively, frequency multiplier 110 may pass the radar signal to one or more additional components of apparatus 100. For example, frequency multiplier 110 may pass the radar signal to a buffer 130. As shown in FIG. 1, buffer 130 may pass the radar signal to one or more phase shifters, such as phase shifters 135(A)-(D). In some embodiments, each of phase shifters 135(A)-(D) may shift the phase of the radar signal by a different amount and/or pass signals with a certain phase (e.g., to facilitate tracking eye movement of a user wearing a head-mounted display equipped with apparatus 100 and therefore steer the direction of the transmitted radar signal). In these embodiments, transmitters 145(A)-(D) may represent a four-channel phased array transmitter. As shown in FIG. 1, apparatus 100 may also include one or more power amplifiers (such as power amplifiers 140(A)-(D)) that increase the power of a frequency-modulated radar signal before the frequency-modulated radar signal is transmitted.

In some embodiments, signal generator 105 may pass the frequency-modulated radar signal (e.g., before the frequency of the radar signal is multiplied) to one or more additional components external to apparatus 100. For example, signal generator 105 may pass the radar signal to one or more receivers via transmission paths 120(B)-(D). In this way, signal generator 105 may synchronize the radar signal received by each transmitter and receiver within a radar system.

Apparatus 100 may include any additional or alternative component not illustrated in FIG. 1, such as one or more controllers, processing devices, portions of memory, resistors, inductors, capacitors, amplifiers, buffers, filters, and the like. Moreover, apparatus 100 may include any suitable number of transmitters (including a single transmitter). In addition, while FIG. 1 illustrates signal generator 105 as part of apparatus 100, signal generator 105 may be external to apparatus 100.

Figure 3:
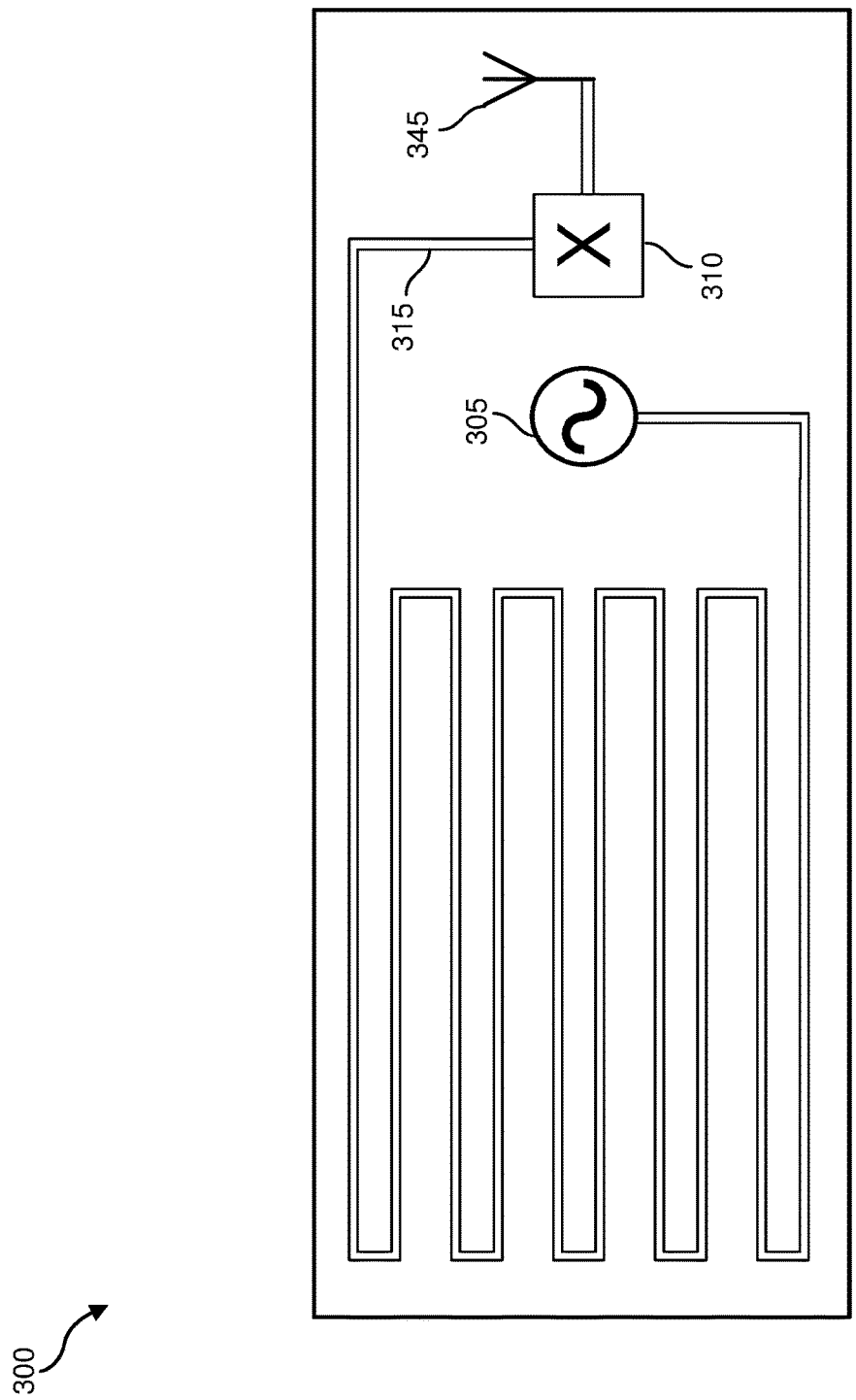
FIG. 3 is an illustration of an exemplary apparatus that may be used in connection with embodiments of this disclosure.

FIG. 3 is an illustration of an exemplary apparatus 300 for radar-based artificial reality tracking. In some examples, apparatus 300 may include and/or represent an integrated circuit, a PCB, a chip, or similar device that is part of and/or included within a radar system and/or an artificial reality system. In one embodiment, apparatus 300 may include all or a portion of apparatus 100 of FIG. 1. For example, apparatus 300 may include a signal generator 305 (corresponding to signal generator 105), a frequency multiplier 310 (corresponding to frequency multiplier 110), and a transmitter 345 (corresponding to one of transmitters 145(A)-(D)). In addition, apparatus 300 may include a delay mechanism 315. In some embodiments, the term "delay mechanism" may refer to any type or form of device that suspends, interrupts, or otherwise delays a frequency-modulated radar signal for a certain period of time before the frequency-modulated radar signal is transmitted to one or more transponders. Delay mechanism 315 may generate and/or implement any suitable period of delay (e.g., 1 millisecond, 5 milliseconds, etc.). In one embodiment, delay mechanism 315 may delay transmission of a frequency-modulated radar signal for a certain percentage (e.g., 10%, 20%, etc.) of the amount of time corresponding to one cycle of the frequency-modulated radar signal.

In one example, delay mechanism 315 may include and/or represent a waveguide. Specifically, delay mechanism 315 may correspond to a fiber optic cable or similar cable. In this example, the length of the cable may be selected and/or determined such that the frequency-modulated radar signal traverses along the cable for the desired period of delay. For example, an appropriate length of the cable may be calculated based on the speed of light within the cable (e.g., 200000 kilometers per second). In other examples, delay mechanism 315 may represent and/or include a coaxial cable, a delay line, a PCB trace, and/or any other suitable mechanism or device. Additionally or alternatively, delay mechanism 315 may be at least partially implemented via software. Moreover, while FIG. 3 illustrates delay mechanism 315 as part of apparatus 300, delay mechanism 315 may be external to apparatus 300 or included within any additional component of a radar system.

In some embodiments, signal generator 305 may generate a frequency-modulated radar signal and then pass the frequency-modulated radar signal to delay mechanism 315. After a certain period of delay, delay mechanism 315 may pass the frequency-modulated radar signal to one or more other components of apparatus 300. In the event that signal generator 305 generated a low-frequency radar signal, delay mechanism 315 may pass the radar signal to frequency multiplier 310 such that the frequency of the radar signal may be multiplied. In the event that signal generator 305 generated a high-frequency radar signal (e.g., a radar signal whose frequency is the desired and/or final transmission frequency), delay mechanism 315 may pass the radar signal directly to transmitter 345 (or another component of apparatus 300, such as a buffer or phase shifter).

Figure 4:
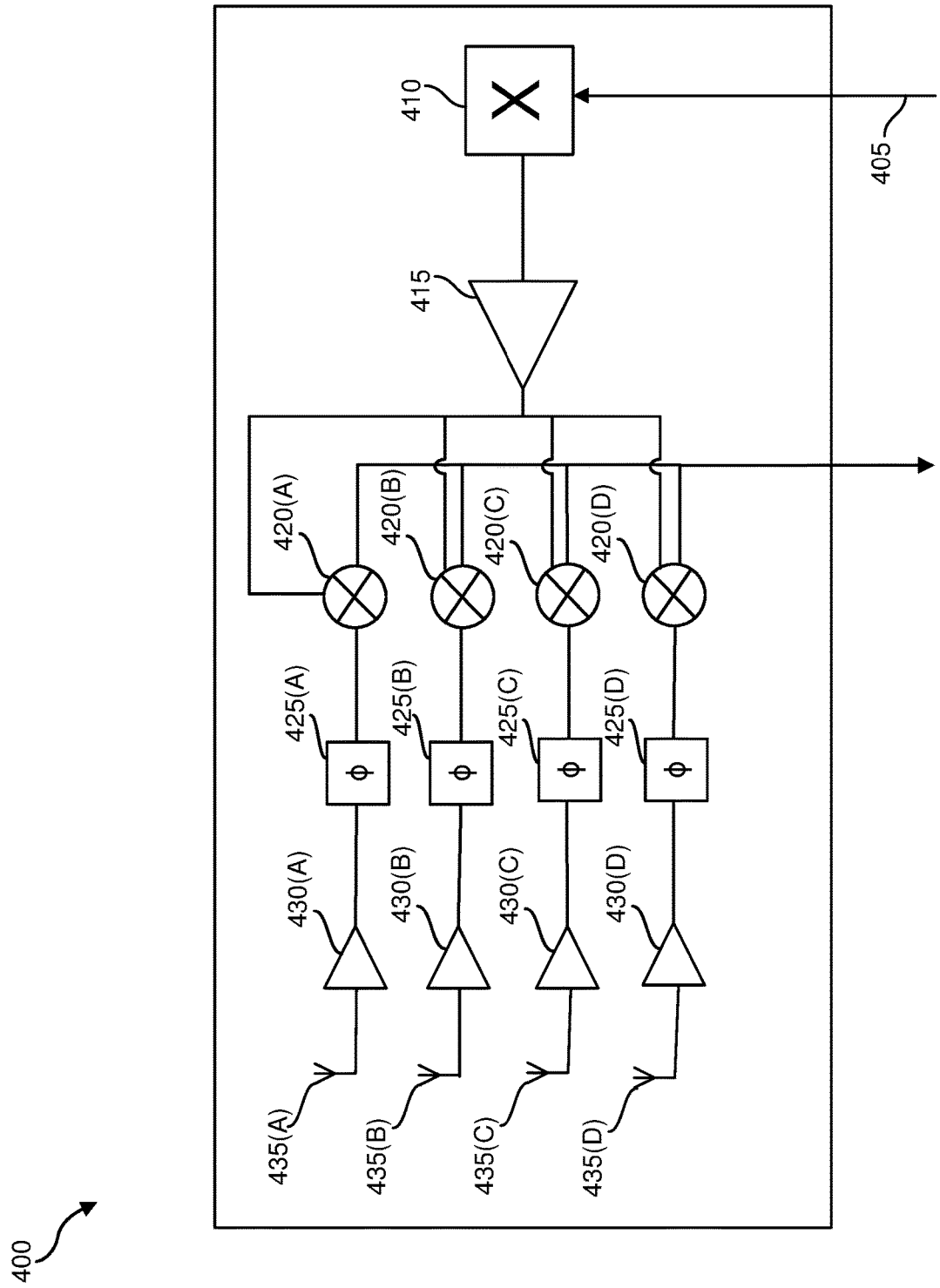
FIG. 4 is an illustration of an exemplary apparatus that may be used in connection with embodiments of this disclosure.

FIG. 4 is an illustration of an exemplary apparatus 400 for radar-based artificial reality tracking. In some embodiments, apparatus 400 may include and/or represent an integrated circuit, a PCB, a chip, or similar device that is part of and/or included within a radar system and/or an artificial reality system. In some examples, apparatus 400 may include one or more receivers, such as receivers 435(A)-(D). In some embodiments, the term "receiver" may refer to any type or form of antenna that receives a signal. In one example, a receiver may receive a signal returned from a target in response to a frequency-modulated radar signal. For example, one or more of receivers 435(A)-(D) may receive signals returned by a set of transponders secured to a wearable artificial reality device.

After receiving a signal, receivers 435(A)-(D) may pass the signal to one or more additional components of apparatus 400. For example, each of receivers 435(A)-(D) may pass the signal to one of amplifiers 430(A)-(D). Amplifiers 430(A)-(D) may represent and/or include low noise amplifiers or any other suitable type of amplifier. After amplifying a received signal, each of amplifiers 430(A)-(D) may pass the signal to one of phase shifters 425(A)-(D). Additionally or alternatively, amplifiers 430(A)-(D) may pass the signal to one of mixers 420(A)-(D). In some embodiments, mixers 420(A)-(D) may mix (e.g., multiply) the signal with a reference signal to facilitate determining the range of the transponder that returned the signal. In one example, apparatus 400 may include one or more components that extract a beat frequency from the mixed signals generated by mixers 420(A)-(D).

In some embodiments, the reference signal utilized by mixers 420(A)-(D) may be transmitted to apparatus 400 via a transmission path 405. In one example, transmission path 405 may correspond to one of transmission paths 120(B)-(D) in FIG. 1. Thus, the reference signal may correspond to the signal generated by signal generator 105 of apparatus 100. In the event that apparatus 100 multiplied the signal generated by signal generator 105 by a certain factor, apparatus 400 may multiply the signal by the same factor. For example, apparatus 400 may pass the signal through a frequency multiplier 410. Frequency multiplier 410 may be generally similar to or the same as frequency multiplier 110 in FIG. 1. In some embodiments, frequency multiplier 410 may pass the signal (with the multiplied frequency) to a buffer 415 before passing the signal to mixers 420(A)-(D). In these embodiments, the combined output of mixers 420

(A)-(D) may represent and/or correspond to the output of apparatus 400 (e.g., a beat signal or beat frequency calculated by apparatus 400.

Figure 5:
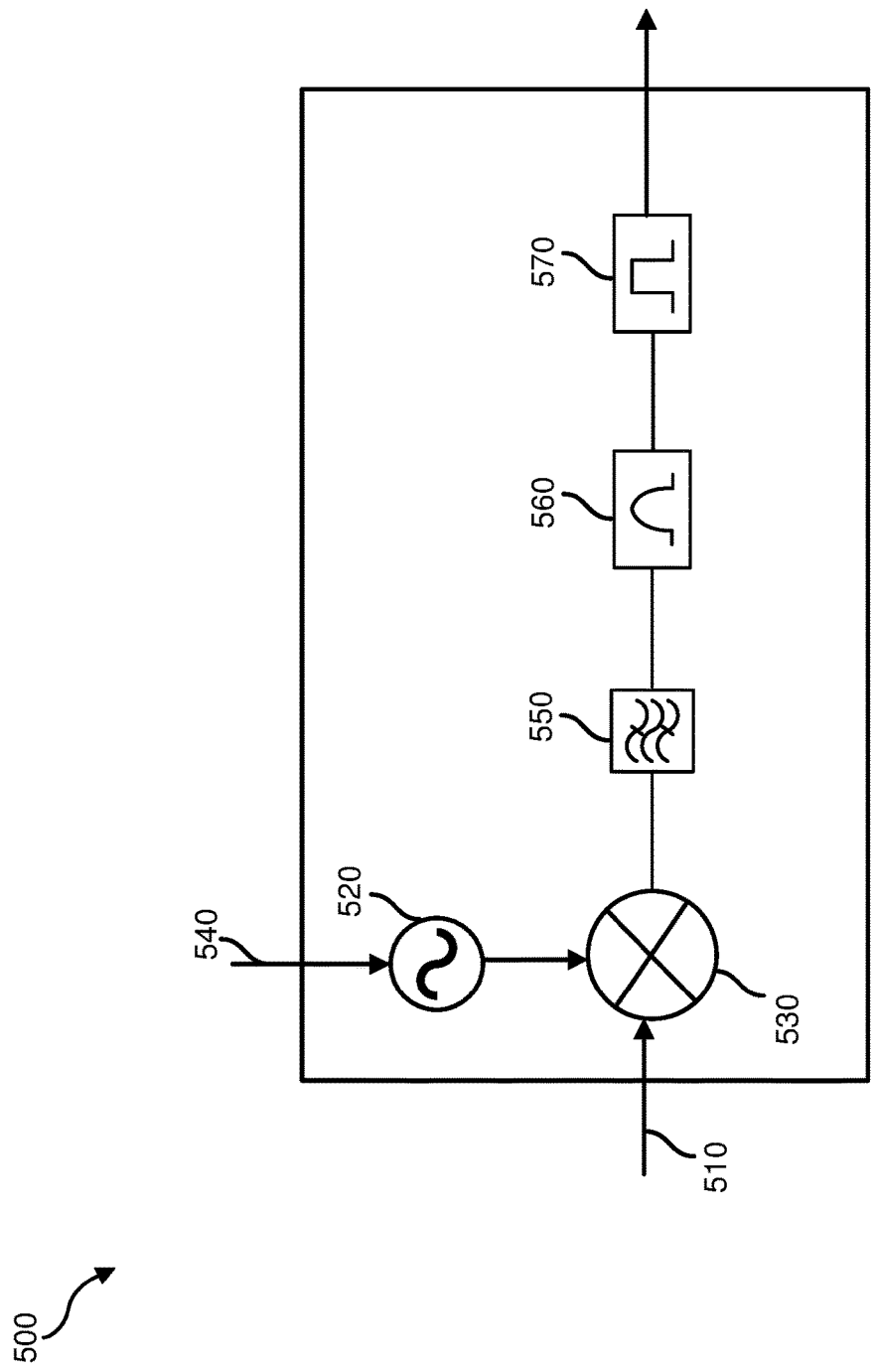
FIG. 5 is an illustration of an exemplary apparatus that may be used in connection with embodiments of this disclosure.

FIG. 5 is an illustration of an exemplary apparatus 500 for radar-based artificial reality tracking. In some embodiments, apparatus 500 may facilitate determining the range of a target (e.g., a transponder). In one embodiment, apparatus 500 may be part of and/or included within apparatus 400. For example, a mixer 530 of apparatus 500 may correspond to one of mixers 420(A)-(D) in FIG. 4. Additionally or alternatively, apparatus 500 may be coupled to and/or in communication with apparatus 400.

In some embodiments, apparatus 500 may receive a reference signal 510. In some examples, reference signal 510 may correspond to the signal output by frequency multiplier 410 of apparatus 400. In one example, apparatus 500 may pass reference signal 510 to a mixer 530. In some embodiments, apparatus 500 may also receive a returned signal 520. Returned signal 520 may correspond to a frequency-modulated radar signal returned to apparatus 500 by a transponder. As shown in FIG. 5, apparatus 500 may pass returned signal 520 to mixer 530. Mixer 530 may then combine (e.g., multiply) reference signal 510 and returned signal 520. The signal produced by mixing a returned signal and a reference signal may be referred to as a beat signal. In some examples, this beat signal may contain one or more frequency components and/or harmonics. Specifically, the frequency of the beat signal may include and/or be represented by $f_c \mp f_b$, where $f_c$ corresponds to the carrier frequency of the frequency-modulated radar signal returned by the transponder and $f_b$ corresponds to the beat frequency. In one embodiment, the carrier frequency may correspond to an intentional frequency shift introduced into the returned signal by the transponder (e.g., to facilitate identifying the transponder within a group of transponders and/or reduce noise within the returned signal).

In some examples, mixer 530 may pass the output of mixer 530 to a filter 550. Filter 550 may represent any type of filter designed to remove frequency-modulation (e.g., frequency-modulation surrounding the beat frequency and/or frequency-modulation corresponding to the frequency-modulated radar signal) from a signal. For example, filter 550 may represent a bandpass filter whose center frequency corresponds to the carrier frequency utilized by a transponder. Filter 550 may filter and then optionally rectify the signal received from mixer 530. In some examples, rectifying the signal may double the frequency of the signal. Filter 550 may then pass the filtered signal to an envelope detector 560 that generates an envelope of the filtered signal. The frequency of this envelope signal may correspond to the beat frequency (or twice the beat frequency). Accordingly, envelope detector 560 may pass the envelope signal to a pulse detector 570 that determines (via, e.g., a comparator or similar device) the frequency of the envelope signal. In the event that filter 550 rectified the signal, pulse detector 570 may take into account that the detected frequency may be twice the beat frequency. In some embodiments, pulse detector 570 may determine the frequency of the envelope signal by detecting at least two subsequent instances at which the value of the envelope signal is zero (or any other suitable value) and then determining the time between each instance. Such an analysis may be referred to as a zero-crossing detection.

Apparatus 500 may include any additional or alternative element not illustrated in FIG. 5. For example, apparatus 500 may include an oscillator and an additional mixer that passes signals with a certain carrier frequency. In this way, the oscillator may act as a filter for signals returned by a certain transponder (e.g., the oscillator may not pass signals returned by transponders that utilize different carrier frequencies). Alternatively, apparatus 500 may separate signals returned from a particular transponder via a bandpass filter whose center frequency corresponds to the carrier frequency utilized by the transponder. In further examples, apparatus 500 may include both a mixer that shifts the frequency of a received signal to a certain frequency (e.g., an intermediate frequency) and a bandpass filter centered around the certain frequency. Such a configuration may be advantageous in applications where a bandpass filter with a high center frequency is unavailable and/or impractical. Moreover, in addition to or instead of envelope detector 560, apparatus 500 may include a square law detector. Apparatus 500 may include any additional type or form of component, including a high pass filter and/or a rectifier.

After determining the beat frequency, apparatus 500 (or a processing device coupled to apparatus 500) may calculate and/or accurately estimate the range of the transponder based on the beat frequency. For example, the processing device may implement the following formula:

$$\text{distance} = \frac{\text{speed of light} \times \text{beat frequency}}{2 \times \text{rate of radar frequency sweep}}.$$

In some embodiments, the processing device may take into account that the beat frequency has been offset by a certain amount due to a delay introduced into the transmitted frequency-modulated radar signal. For example, the processing device may subtract a predetermined and/or intentional frequency offset from the beat frequency output by apparatus 500 before calculating the range based on the beat frequency. Additional or alternative embodiments of such a formula may account for certain real-world offsets, compensations, and/or processing delays that potentially affect the travel time of the transmission and/or returned signals.

In some embodiments, the processing device may store information about the range and/or location of the transponder. Additionally or alternatively, the processing device may pass this information to an artificial reality system that provides virtual content (such as images and/or haptic feedback) to the user. The artificial reality system may use this information to generate and/or improve the virtual content. For example, the artificial reality system may adjust the location at which the user perceives a portion of virtual content to account for an updated and/or current location of the user. In another example, the artificial reality system may adjust the location and/or appearance of a virtual representation of the user that is provided to an additional user remotely.

Figure 6:
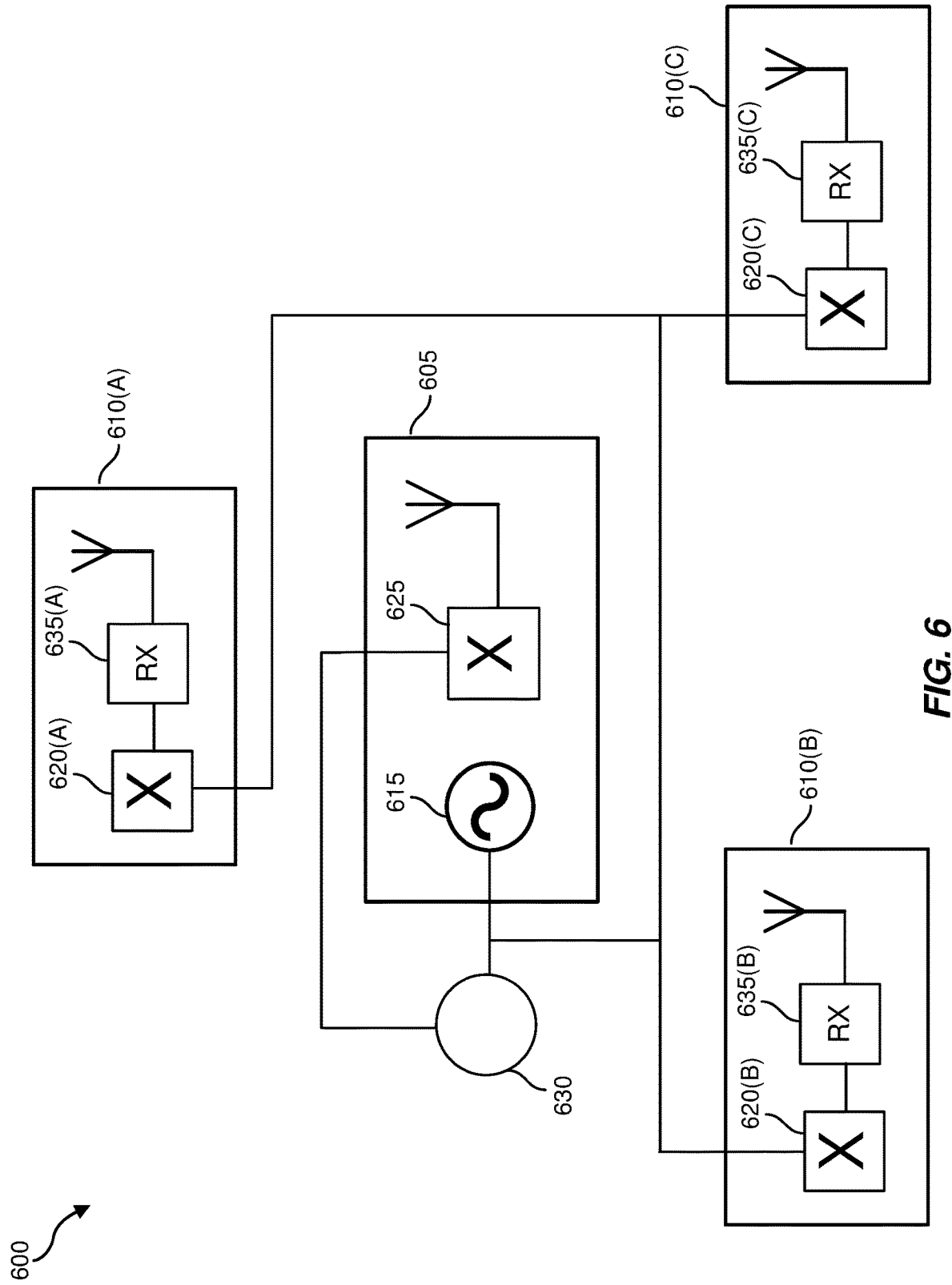
FIG. 6 is an illustration of an exemplary system that may be used in connection with embodiments of this disclosure.

FIG. 6 is an illustration of an exemplary system 600 for radar-based artificial reality tracking. In this example, system 600 may include at least one transmitter. For example, apparatus 605 of system 600 may correspond to and/or include an instance of apparatus 100 in FIG. 1. In addition, system 600 may include one or more receivers. For example, each of apparatuses 610(A)-(C) may correspond to and/or include an instance of apparatus 400 in FIG. 4. In some embodiments, the receivers within apparatuses 610(A)-(C) may facilitate three-dimensional localization of a transponder. For example, each of apparatuses 610(A)-(C) may be secured at least a certain distance (e.g., several centimeters, several inches, etc.) apart from each other and/or apparatus 605. The apparatuses may be secured on a wearable device (such as an artificial reality headset), within the physical environment surrounding a user of an artificial reality system, and/or in any other suitable manner.

In some embodiments, apparatus 605 may include a signal generator 615 that generates a frequency-modulated radar signal. In these embodiments, signal generator 615 may pass the frequency-modulated radar signal to frequency multipliers 620(A)-(C) within apparatuses 610(A)-(C). The frequency-modulated radar signal received by each of apparatuses 610(A)-(C) may be utilized (e.g., by receiving devices 635(A)-(C) within apparatuses 610(A)-(C)) as a reference signal to facilitate ranging a transponder based on signals received at each apparatus. In one example, signal generator 615 may synchronously pass the same frequency-modulated radar signal to each of apparatuses 610(A)-(C). For example, the instantaneous frequency of the frequency-modulated radar signal received by each of apparatuses 610(A)-(C) may be the same (or approximately the same). In addition, the frequency-modulated radar signals may be in-phase with each other. In some embodiments, synchronously passing the frequency-modulated radar signal to each of apparatuses 610(A)-(C) may ensure that the beat frequencies determined by the apparatuses are not offset relative to each other, as well as reduce and/or minimize phase interference between the apparatuses.

In some embodiments, the signal generator of apparatus 605 may also pass the frequency-modulated radar signal to a delay mechanism 630. Delay mechanism 630 may correspond to an embodiment of delay mechanism 315 in FIG. 3 and/or any other suitable delay mechanism. After delaying the frequency-modulated radar signal by a certain amount of time, delay mechanism 630 may pass the frequency-modulated radar signal back to apparatus 605 (e.g., a frequency multiplier 625 and/or a transmitter of apparatus 605). Thus, delay mechanism 630 may offset the instantaneous frequency of the frequency-modulated radar signal transmitted by apparatus 605 by a certain amount relative to the instantaneous frequency of the reference signals utilized by apparatuses 610(A)-(C). For example, in the event that the frequency-modulated radar signal is defined by and/or corresponds to a linear frequency sweep whose final frequency is higher than its initial frequency, the instantaneous frequency transmitted by apparatus 605 may be lower than the instantaneous frequency of the reference signals.

Figure 7:
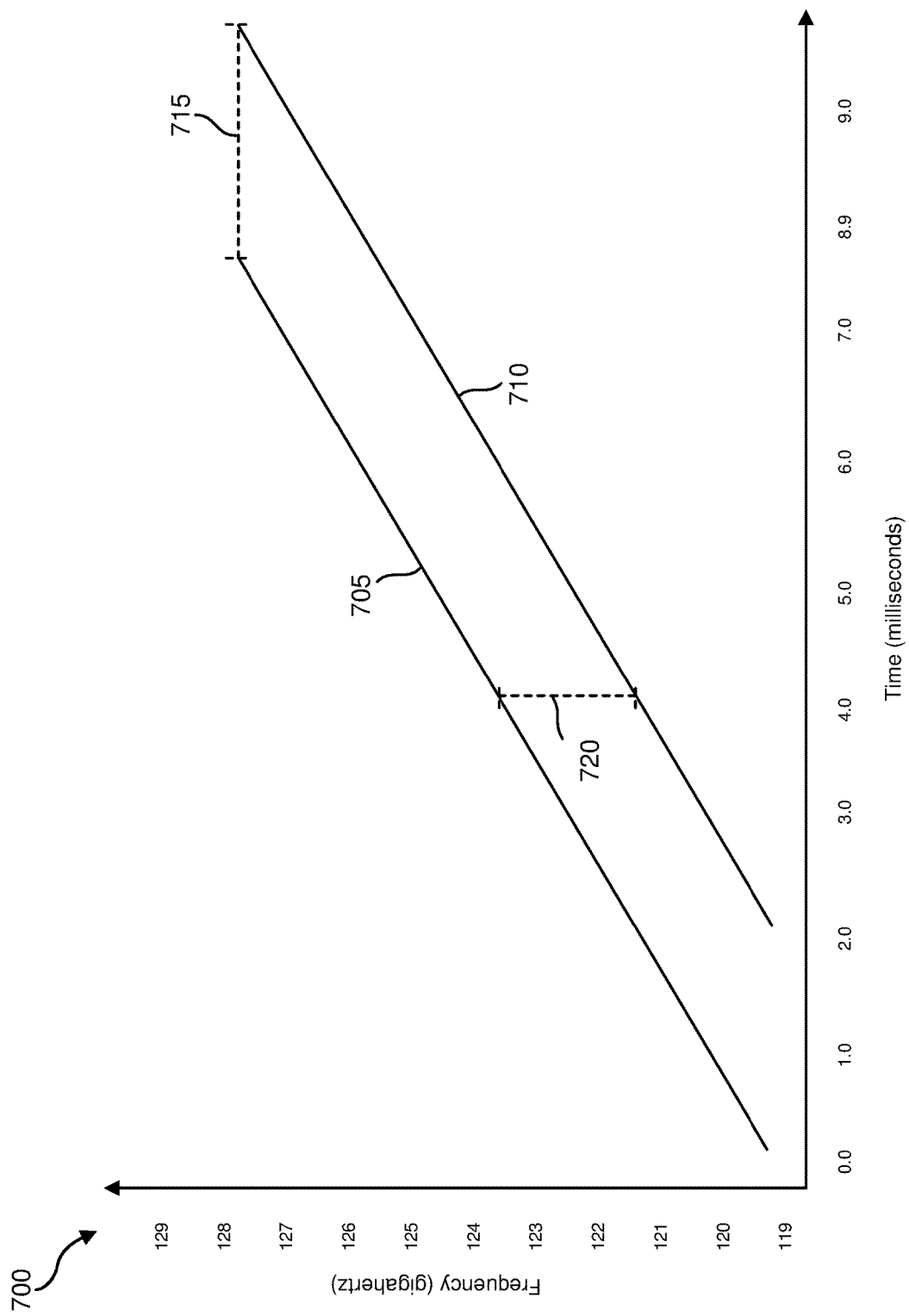
FIG. 7 is an illustration of exemplary frequency ramps.

FIG. 7 illustrates a plot 700 that shows exemplary frequency-modulated radar signals that may be passed to the receivers and transmitters of system 600. For example, plot 700 includes a frequency ramp 705 that may correspond to and/or describe the frequency-modulated radar signals passed to apparatuses 610(A)-(C) to be used as reference signals. In addition, plot 700 includes a frequency ramp 710 that may correspond to and/or describe the frequency-modulated radar signal transmitted by apparatus 605. As shown in FIG. 7, frequency ramp 710 may be offset relative to frequency ramp 705 by a time period 715 (e.g., 2 milliseconds). Due to this delay, the instantaneous frequency of frequency ramp 710 may be offset by a frequency offset 720 (e.g., 2 gigahertz) relative to the instantaneous frequency of frequency ramp 705.

Returning to FIG. 6, in some embodiments, each of apparatuses 610(A)-(C) may receive a frequency-modulated signal returned from a transponder in response to the frequency-modulated radar signal transmitted by apparatus 605. These returned signals may include frequency offsets corresponding to both (1) the intentional delay introduced into the frequency-modulated radar signal by delay mechanism 630 (e.g., frequency offset 720 in FIG. 7) and (2) the amount of time required for the frequency-modulated radar signal to traverse to and from the transponder. Because a beat frequency corresponds to the difference between the instantaneous frequency of the returned signal and the instantaneous frequency of the reference signal, the frequency offset corresponding to the intentional delay may introduce an offset into the beat frequency calculated by apparatuses 610(A)-(C). Specifically, the apparent (e.g., calculated) beat frequency may be greater than a beat frequency that corresponds to the actual range of the transponder. The disclosed radar systems may account for this offset within the beat frequency when determining the range of the transponder.

As discussed in connection with FIG. 5, the disclosed radar systems may determine a beat frequency using a zero-crossing analysis (e.g., detecting the frequency of a beat signal after the beat signal has been filtered, rectified, and passed through an envelope filter). In some examples, a zero-crossing analysis may involve analyzing several (e.g., 2 or 3) periods of a beat signal. Thus, decreasing the length of these periods (by increasing the frequency of the beat signal) may decrease the amount of time involved in detecting the beat frequency. In some embodiments, decreasing this amount of time may reduce latency in various applications that utilize real-time localization of targets (such as presenting virtual reality content to a user of an augmented and/or artificial reality system). In addition, reducing the time involved in ranging a target may reduce the amount of power consumed by a radar system, as well as the operational frequency bandwidth of the radar system. Furthermore, intentionally increasing a beat frequency may facilitate accurate localization of close-range targets.

In some embodiments, implementing one or more frequency multipliers within a radar system may facilitate delaying transmission of a frequency-modulated radar signal. For example, the frequency-modulated radar signal generated by signal generator 615 may attenuate and/or degrade while traversing through delay mechanism 630. In general, the attenuation of the frequency-modulated radar signal may increase with the length that the frequency-modulated radar signal travels. Thus, passing a radar signal through a cable or similar delay mechanism may result in relatively high levels of attenuation (e.g., compared to passing a radar signal directly to a transmitter). However, because low-frequency signals may generally attenuate at a lower rate than high-frequency signals, passing a relatively low-frequency radar signal through delay mechanism 630 (and then multiplying the frequency of the radar signal) may reduce the overall amount by which the radar signal attenuates.

Figure 8:
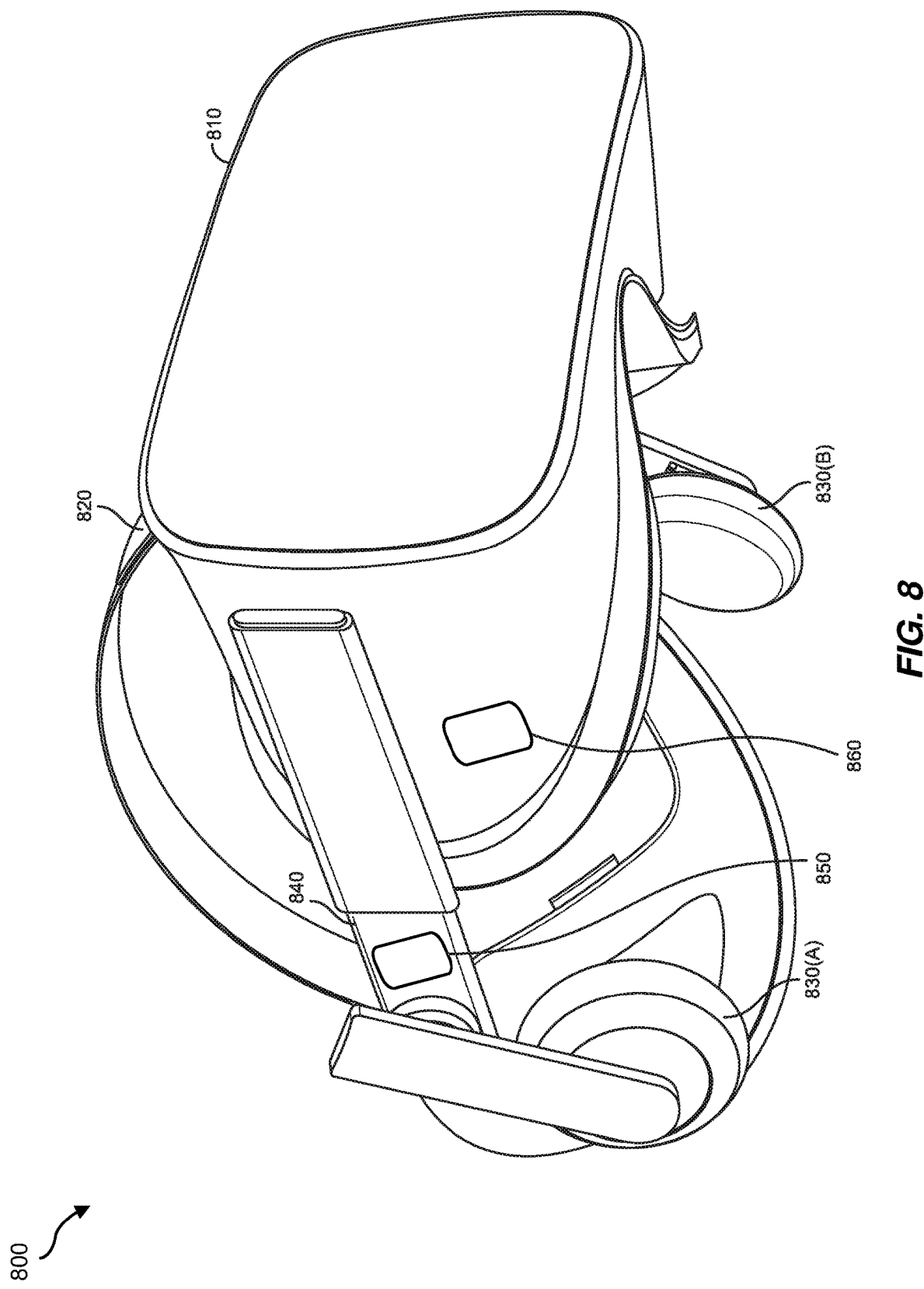
FIG. 8 is an illustration of an exemplary wearable device that may be used in connection with embodiments of this disclosure.

FIG. 8 illustrates an exemplary wearable device 800 for radar-based artificial reality tracking. In some embodiments, the term "wearable device" may refer to any type or form of computing device that is worn by a user of an artificial reality system as part of an article of clothing, an accessory, and/or an implant. Examples of wearable device include, without limitation, headsets, headbands, head-mounted displays, wristbands, gloves, glasses, and/or ankle bands. In one embodiment, wearable device 800 may correspond to and/or represent a head-mounted display that is designed to be worn on a user's face. As shown in FIG. 8, wearable device 800 may include a front rigid body 810 and a band 820 shaped to fit around the user's head. Wearable device 800 may also include output audio transducers 830(A) and 830(B). In addition, wearable device 800 may include a connector 840 that connects front rigid body 810 to band 820 and/or audio transducers 830(A).

As shown in FIG. 8, wearable device 800 may include one or more radar devices, such as a radar device 850 and a radar device 860. In one embodiment, radar devices 850 and 860 may correspond to apparatuses 610(A) and 610(B) in FIG. 6, respectively. Although not illustrated in FIG. 8, wearable device 800 may also include one or more instances of apparatuses 605 and 610(C). These apparatuses may be secured to wearable device 800 in any suitable location, configuration, or pattern. For example, apparatus 605 may be secured in a central location of wearable device 800, such as the top of front rigid body 810 or band 820. In this example, apparatuses 610(A)-(C) may surround apparatus 605 (e.g., apparatuses 610(A)-(C) may form a triangle around apparatus 605). In some embodiments, wearable device 800 may also include one or more delay mechanisms (such as delay mechanism 630). In addition, wearable device 800 may include a processing device that directs, controls, and/or receives input from one or more radar devices secured to wearable device 800. In some embodiments, this processing device may be part of and/or communicate with an artificial reality system that presents virtual content to the user. Wearable device 800 may also include any number or type of communication interfaces, memory devices, displays, power supplies, and the like.

Figure 9:
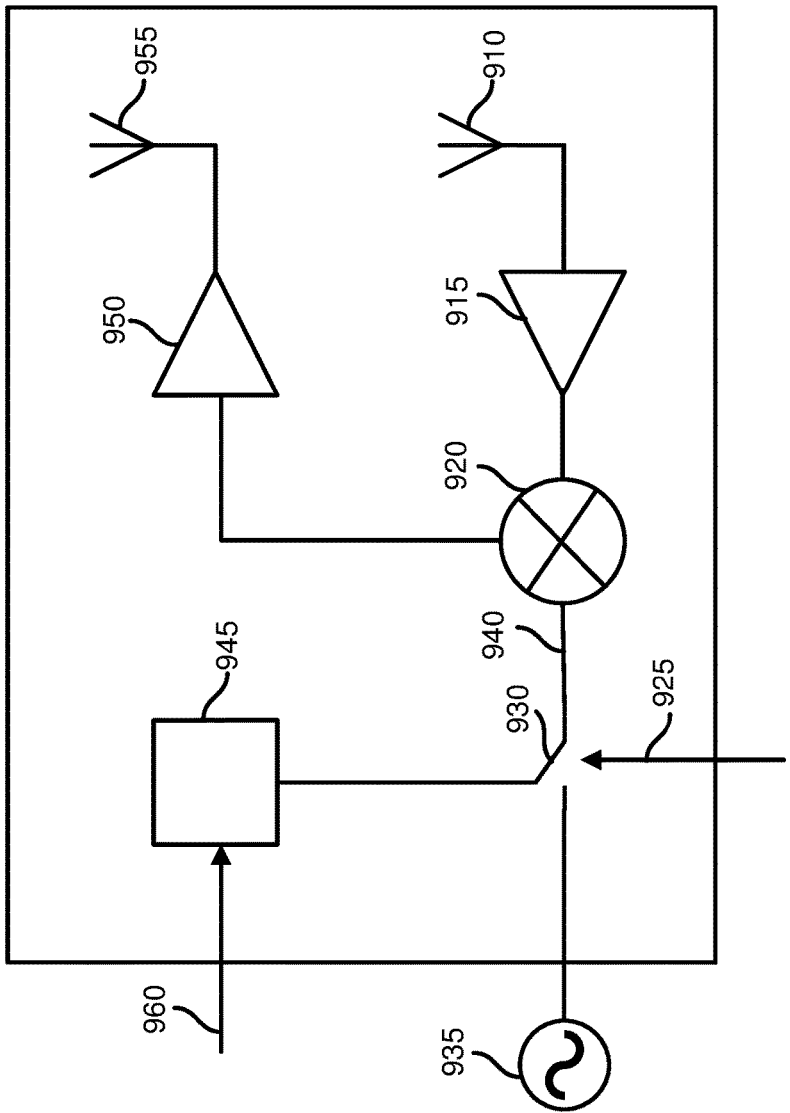
FIG. 9 is an illustration of an exemplary apparatus that may be used in connection with embodiments of this disclosure.

FIG. 9 is an illustration of an exemplary transponder 900. In some examples, transponder 900 may include a receiving antenna 910 that receives frequency-modulated radar signals from transmitters. After receiving antenna 910 receives a signal, receiving antenna 910 may pass the signal to an amplifier 915 that increases the power of all or a portion of the received signal. In one embodiment, amplifier 915 may represent a low-noise amplifier. In some examples, transponder 900 may retransmit the received signal after the received signal has been amplified. For example, amplifier 915 may pass the amplified signal directly to a transmitting antenna 955. In other embodiments, transponder 900 may shift the frequency of the received signal by a certain amount before retransmitting the received signal.

Transponder 900 may shift the frequency of the received signal in a variety of ways. In one embodiment, amplifier 915 may pass the received signal to a mixer 920. In this embodiment, mixer 920 may shift the frequency of the received signal based on a signal 940 that is also passed to mixer 920. For example, mixer 920 may multiply the received signal and signal 940 in order to shift the frequency of the received signal by an amount corresponding to the frequency of signal 940. In one example, signal 940 may be provided by an oscillator 935 that outputs a signal with a certain frequency. Alternatively, signal 940 may be provided by a frequency divider 945 that generates a signal with a certain frequency by dividing a signal 960 that has a different frequency. In one embodiment, signal 960 may be generated and/or transmitted by a remote component of a radar system. For example, signal 960 may be provided by a processing device that directs the operation of transponder 900. As shown in FIG. 9, the input to mixer 920 may be controlled by a control signal 925 that is input to a switch 930.

After mixer 920 shifts the frequency of the received signal, mixer 920 may pass the shifted signal to an amplifier 950. After amplifying the shifted signal by a certain amount, amplifier 950 may pass the shifted signal to transmitting antenna 955. Transmitting antenna 955 may then transmit the shifted signal such that the shifted signal may be received by a receiver.

Transponder 900 may include any additional or alternative components not illustrated in FIG. 9. For example, transponder 900 may include a processing device that directs and/or controls one or more components of transponder 900. Additionally or alternatively, transponder 900 may include any number or type of communication interfaces (such as Serial Peripheral Interfaces (SPIs)), memory devices, power detectors, and/or power supplies. Moreover, transponder 900 may receive and transmit signals whose frequencies correspond to any suitable range and/or value. In one embodiment, transponder 900 may be capable of and/or configured to receive frequency-modulated radar signals whose frequencies sweep between approximately 120 gigahertz and 130 gigahertz. In addition, transponder 900 may be capable of shifting the frequencies of signals by any suitable amount. For example, transponder 900 may shift the frequencies of received signals by 1 megahertz, 2 megahertz, etc.

Figure 10:
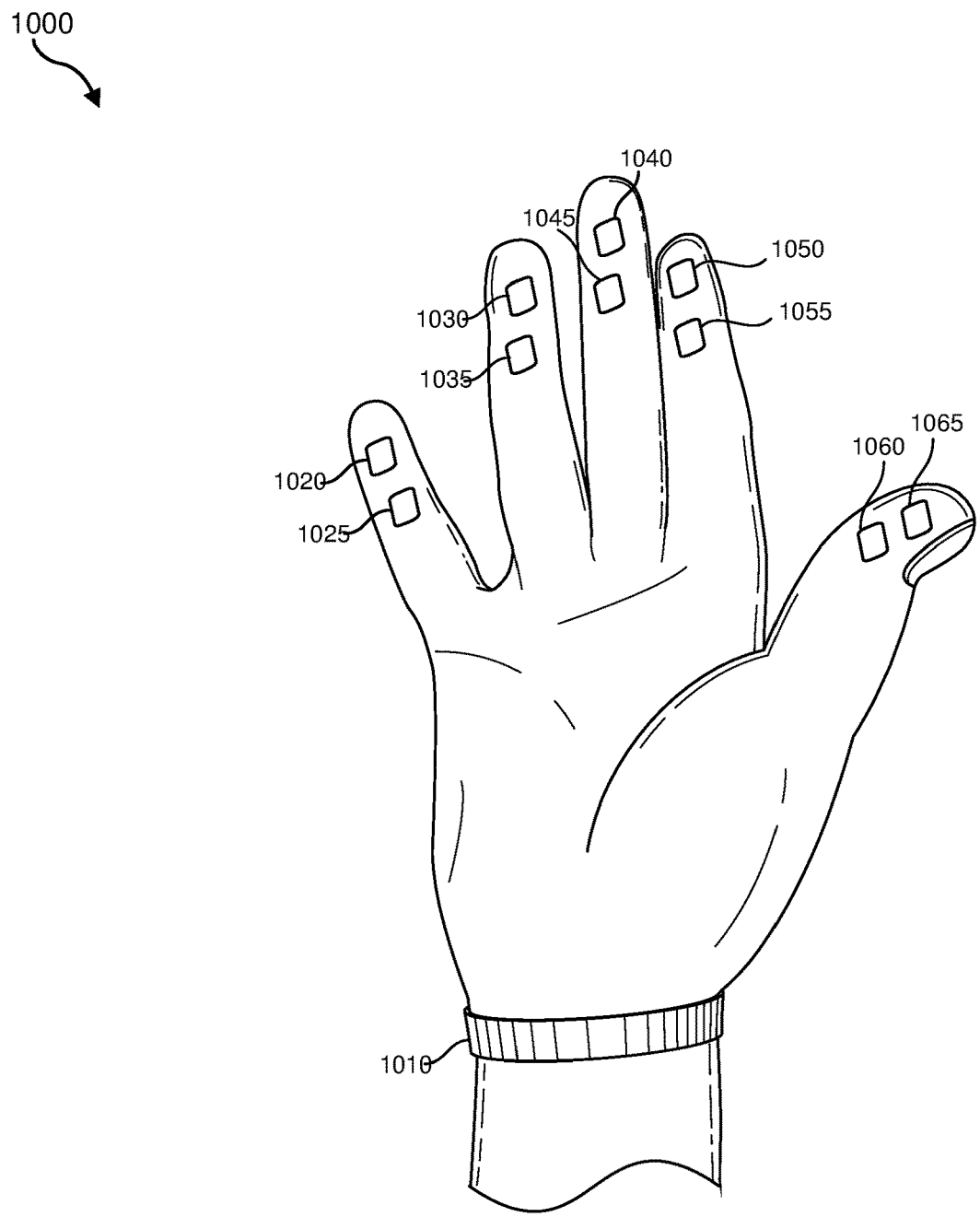
FIG. 10 is an illustration of an exemplary wearable device that may be used in connection with embodiments of this disclosure.

FIG. 10 is an illustration of an exemplary wearable device 1000 for radar-based artificial reality tracking. In one example, wearable device 1000 may represent and/or include a glove that is designed to be worn on the hand and/or wrist of a user. Wearable device 1000 may include and/or contain a variety of different materials. Examples of such materials include, without limitation, cottons, polyesters, nylons, elastics, plastics, neoprene, rubbers, metals, combinations or variations of one or more of the same, and/or any other suitable materials. Wearable device 1000 may be defined and/or formed in a variety of shapes and/or sizes with the aim of securing to the hand and/or wrist of a user of an artificial reality system. In some examples, one or more components of wearable device 1000 (such as a wristband 1010) may be adjustable to provide a one-size-fits-most feature.

In some examples, wearable device 1000 may include one or more transponders. For example, as shown in FIG. 10, wearable device 1000 may include transponders 1020, 1025, 1080, 1085, 1040, 1045, 1050, 1055, 1060, and 1065. In one embodiment, all or a portion of these transponders may correspond and/or be generally similar to transponder 900 illustrated in FIG. 9. In addition, these transponders may be fastened, attached, and/or secured to wearable device 1000 in any suitable manner and/or configuration.

In one embodiment, the transponders on wearable device 1000 may facilitate determining the position of the front of each of the user's fingers. For example, these transponders may be secured in locations that correspond to the user's fingertips when the user is wearing wearable device 1000. Wearable device 1000 may include any additional or alternative transponders not shown in FIG. 10, such as one or more transponders that facilitate determining the position of the back of the user's fingers and/or the position of the user's palm.

Figure 11:
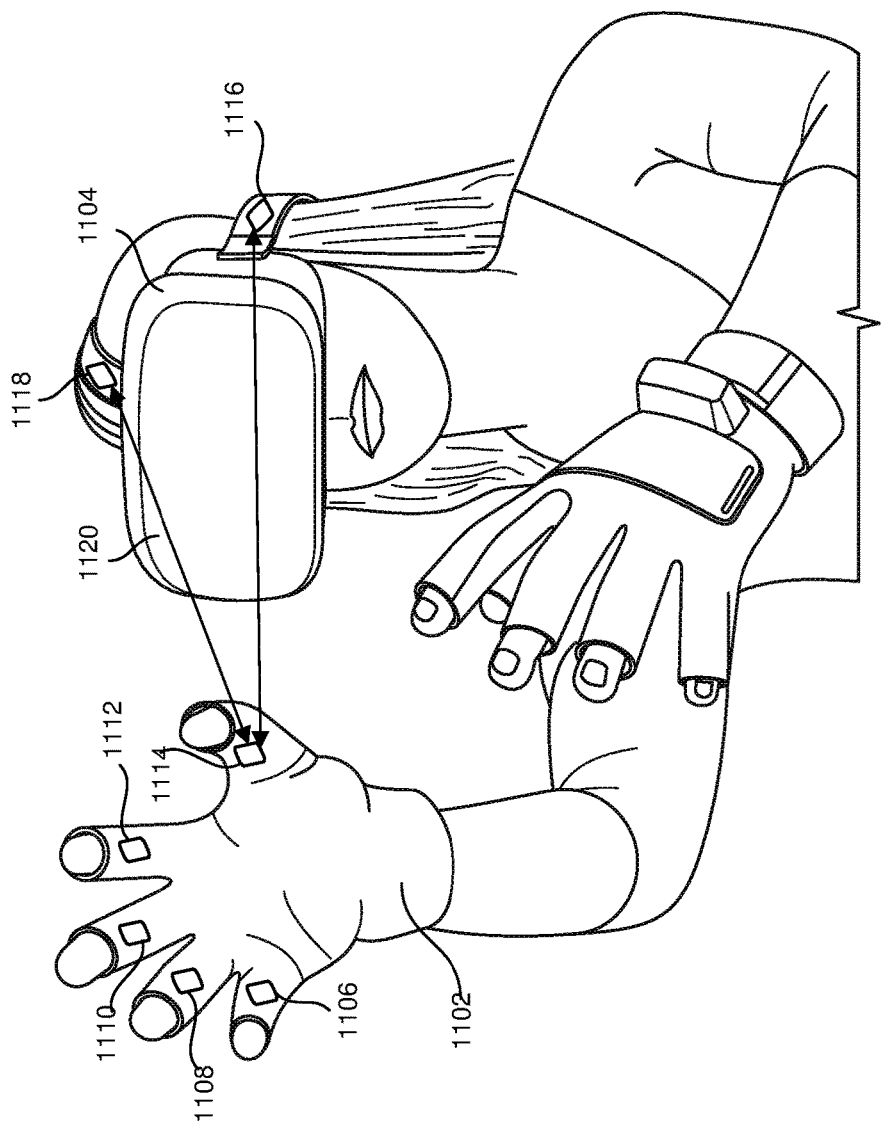
FIG. 11 is an illustration of an exemplary artificial reality environment that may be used in connection with embodiments of this disclosure.

FIG. 11 illustrates an exemplary system 1100 for radar-based artificial reality tracking. Specifically, FIG. 11 illustrates a user wearing a glove 1102 (which may correspond to an embodiment of wearable device 1000 in FIG. 10) and a head-mounted display 1104 (which may correspond to an embodiment of wearable device 800 in FIG. 8). In this example, head-mounted display 1104 may include one or more radar devices, such as a radar device 1116 and a radar device 1118 (which may correspond to one or more of apparatuses 605 and 610(A)-(C) in FIG. 6). In some embodiments, the radar devices of glove 1102 may determine the range of one or more transponders (e.g., transponders 1106, 1108, 1110, 1112, and 1114) secured to glove 1102. The radar devices may then pass information about the range of the transponders to a processing device and/or artificial reality system that provides virtual content to the user via head-mounted display 1104. For example, the processing device and/or artificial reality system may determine a current physical location of the portions of the user corresponding to the transponders of glove 1102. The artificial reality system may then provide virtual content to the user based on these locations.

As a specific use-case example, head-mounted display 1104 may provide virtual content (e.g., images, videos, and/or graphics) to the user via a display 1120. In this example, head-mounted display 1104 may project images on display 1120 that create the perception of the user holding an object. Based on the current location of the transponders on glove 1102, head-mounted display 1104 may select and/or adjust the location of the projected images on display 1120 to provide a believable and immersive virtual experience for the user. In some embodiments, head-mounted display 1120 may periodically update the location and/or appearance of the projected images to account for movement of the user's hand and/or head.

Figure 12:
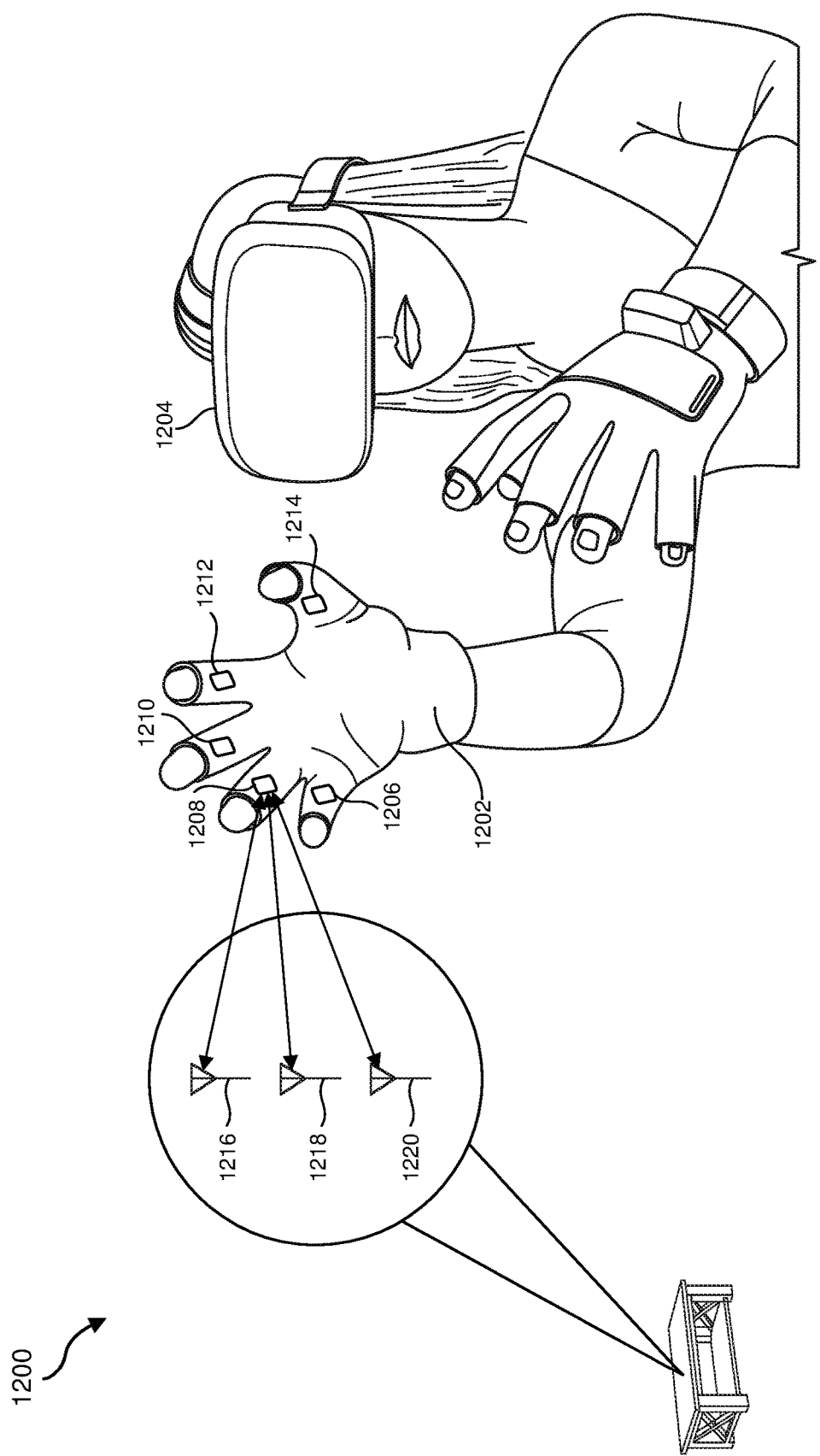
FIG. 12 is an illustration of an exemplary artificial reality environment that may be used in connection with embodiments of this disclosure.

FIG. 12 illustrates an exemplary system 1200 that facilitates radar-based artificial reality tracking. Specifically, FIG. 12 illustrates a user wearing a glove 1202 (which may correspond to an embodiment of wearable device 1000 in FIG. 10) and a head-mounted display 1204 (which may correspond to an embodiment of wearable device 800 in FIG. 8). FIG. 12 also illustrates an array of radar devices that may include radar devices 1216, 1218, 1222, and 1222 (which may correspond to apparatuses 605 and 610(A)-(C) in FIG. 6). These radar devices may be located within the physical environment surrounding the user (rather than on a wearable device worn by the user). For example, as illustrated in FIG. 12, the radar devices may be located on a nearby table. In contrast to the radar devices of system 1100, the radar devices of system 1200 may be stationary (e.g., in a fixed location).

In some embodiments, radar devices 1216, 1218, 1220, and/or 1222 may periodically determine the range of all or a portion of the transponders of glove 1202 (e.g., transponders 1206, 1208, 1212, 1212, and/or 1214). The radar devices may then pass information about the range of the transponders to a processing device and/or artificial reality system. In one embodiment, this artificial reality system may provide virtual content to the user via head-mounted display 1204 (as discussed in connection with FIG. 9). Additionally or alternatively, the artificial reality system may provide virtual content to an additional (e.g., remote) user.

As a specific use-case example, the user wearing glove 1202 may interact remotely (via, e.g., a computing device and/or a network) with an additional user. In this example, the artificial reality system may provide a virtual representation of all or a portion of the user wearing glove 1202 to the additional user. For example, based on the current location of the transponders on glove 1202, the artificial reality system may insert an image of all or a portion of the user's hand into a virtual three-dimensional environment displayed to the additional user. Additionally, the artificial reality system may periodically update the location and/or appearance of the image to account for movement of the user's hand. These features of the disclosed radar systems may be useful and/or advantageous in a variety of applications, including gaming applications and remote-conferencing applications.

Figure 13:
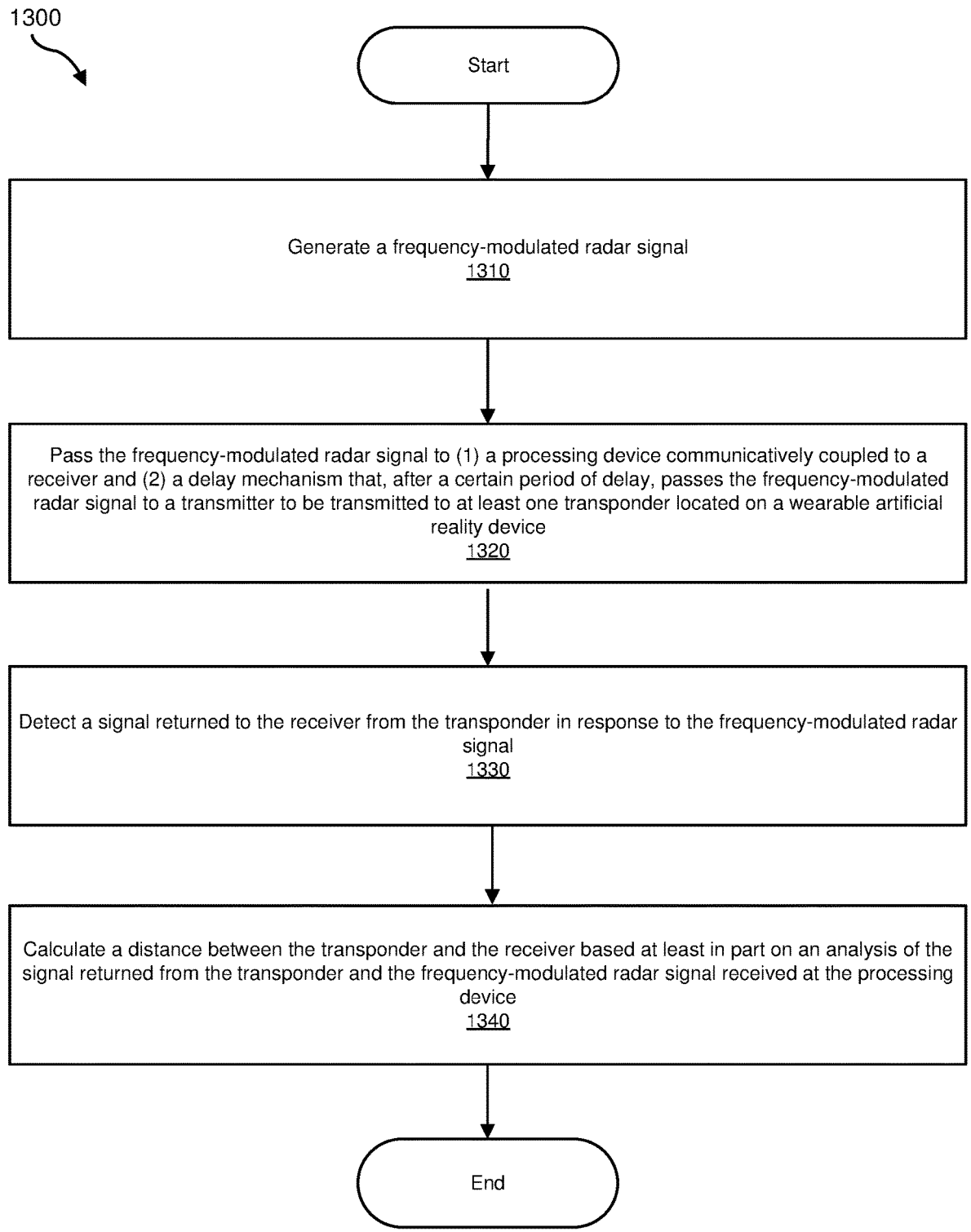
FIG. 13 is a flowchart of an exemplary method for radar-based artificial reality tracking.

FIG. 13 is a flow diagram of an exemplary method 1300 for radar-based artificial reality tracking according to any of the embodiments disclosed herein. The steps shown in FIG. 13 may incorporate and/or involve various sub-steps and/or variations consistent with the descriptions described above in connection with FIGS. 1-12.

As illustrated in FIG. 13, at step 1310 a radar system may generate a frequency-modulated radar signal. In one embodiment, the frequency-modulated radar signal may be defined by and/or correspond to a linear frequency sweep. For example, the frequency-modulated radar signal may sweep between approximately 120 gigahertz and 130 gigahertz. In another example, the frequency of the radar signal may be lower than the frequency radar signals that are ultimately transmitted by the radar system. For example, the frequency-modulated radar signal may sweep between approximately 7 gigahertz and 8 gigahertz.

At step 1320 in FIG. 13, the radar system may pass the frequency-modulated radar signal to (1) a processing device communicatively coupled to a receiver and (2) a delay mechanism that, after a certain period of delay, passes the frequency-modulated radar signal to a transmitter to be transmitted to at least one transponder located on a wearable artificial reality device. In the event that the radar system generated a low-frequency radar signal, the radar system may pass the radar signal through one or more frequency multipliers coupled to the processing device and/or the transmitter. These frequency multipliers may increase the frequency of the radar signal to a final and/or appropriate level.

In some embodiments, the delay mechanism may suspend transmission of the frequency-modulated radar signal such that the instantaneous frequency of the transmitted radar signal is lower (e.g., by a certain or predetermined amount) than the instantaneous frequency of the frequency-modulated radar signal passed to the processing device. In one embodiment, the delay mechanism may include and/or represent a fiber optic cable. The length of the fiber optic cable may be selected such that the frequency-modulated radar signal traverses along the cable for the certain period of delay.

At step 1330 in FIG. 13, the radar system may detect a signal returned to the receiver from the transponder in response to the frequency-modulated radar signal. For example, the processing device coupled to the receiver may periodically or continuously monitor signals received by the receiver.

At step 1340 in FIG. 13, the radar system may calculate a distance between the transponder and the receiver based at least in part on an analysis of the signal returned from the transponder and the frequency-modulated radar signal received at the processing device. For example, the radar system may combine the returned signal with a reference signal (e.g., the frequency-modulated radar signal that was passed to the processing device) and then extract a beat frequency from the combined signal. In this example, the beat frequency may include an offset (e.g., an increase) due to the delay introduced into the transmitted frequency-modulated radar signal. The radar system may account for this offset within the beat frequency when determining the distance between the transponder and the received based on the beat frequency.

In some embodiments, the radar system may determine a three-dimensional location of the transponder based on a combined analysis of signals received at each receiver of the radar system. For example, the radar system may determine a current physical location of the portion of the user's body that is coupled to and/or in contact with the transponder. In some embodiments, the radar system may pass information about the current physical location of the portion of the user to an artificial reality system. The artificial reality system may then generate and/or modify one or more virtual components presented to the user based on the current physical location of the portion of the user.

Example 1: A radar system that includes a radar mechanism comprising a transmitter and at least one receiver. The radar system may also include a signal generator that generates a frequency-modulated radar signal. In addition, the radar system may include a delay mechanism that (1) receives the frequency-modulated radar signal from the signal generator and (2) after a certain period of delay, passes the frequency-modulated radar signal to the transmitter to be transmitted to at least one transponder located on a wearable artificial reality device. Furthermore, the radar system may include at least one processing device communicatively coupled to the receiver, wherein the processing device (2) receives the frequency-modulated radar signal from the signal generator, (2) detects a signal returned to the receiver from the transponder in response to the frequency-modulated radar signal, and (2) calculates a distance between the transponder and the receiver based at least in part on an analysis of the signal returned from the transponder and the frequency-modulated radar signal received from the signal generator.

Example 2: The radar system of Example 1, further comprising an additional wearable artificial reality device that secures at least the transmitter, the receiver, the signal generator, and the delay mechanism.

Example 3: The radar system of Example 2, wherein the receiver comprises a plurality of receivers that are secured to the additional wearable artificial reality device such that each of the plurality of receivers are separated by at least a certain distance.

Example 4: The radar system of any of Examples 1-3, wherein the processing device calculates the distance between the transponder and the receiver based at least in part on calculating a beat frequency that (1) corresponds to a difference between an instantaneous frequency of the frequency-modulated radar signal received at the processing device and an instantaneous frequency of the signal returned from the transponder and (2) is proportional to the distance between the transponder and the receiver.

Example 5: The radar system of Example 4, wherein (1) the frequency-modulated radar signal follows a modulation cycle that comprises an approximately linear sweep between a first frequency and a second frequency and (2) the certain period of delay generated by the delay mechanism causes (A) the transmitter to receive the frequency-modulated radar signal at a different point in the modulation cycle than the processing device and (B) the instantaneous frequency of the frequency-modulated radar signal received by the processing device to be offset by a certain amount relative to an instantaneous frequency of the frequency-modulated radar signal transmitted by the transmitter.

Example 6: The radar system of Example 5, wherein offsetting the instantaneous frequency of the frequency-modulated radar signal transmitted by the transmitter increases the beat frequency by a certain value such that the apparent distance between the transponder and the receiver exceeds the distance between the transponder and the receiver by a certain length.

Example 7: The radar system of Example 5, wherein the processing device accounts for the increase in the beat frequency by the certain amount while calculating the distance between the transponder and the receiver.

Example 8: The radar system of any of Examples 1-7, wherein the delay mechanism comprises a fiber optic cable that transmits the frequency-modulated radar signal from the signal generator to the transmitter.

Example 9: The radar system of Example 8, wherein a length of the fiber optic cable is selected such that the frequency-modulated radar signal traverses along the fiber optic cable for an amount of time corresponding to the certain period of delay.

Example 10: The radar system of any of Examples 1-9, wherein the delay mechanism comprises a coaxial cable, a delay line, and/or a light-emitting diode.

Example 11: The radar system of any of Examples 1-10, further comprising a frequency multiplier positioned between the delay mechanism and the transmitter.

Example 12: The radar system of Example 11, wherein the frequency multiplier (1) receives the frequency-modulated radar signal from the delay mechanism and (2) passes the frequency-modulated radar signal to the transmitter after multiplying a frequency of the frequency-modulated radar signal by a certain factor.

Example 13: The radar system of any of Examples 1-12, wherein the processing device further determines, based at least in part on the distance between the transponder and the receiver, a current three-dimensional location of at least a portion of a user wearing the wearable artificial reality device.

Example 14: The radar system of Example 13, wherein (1) the processing device further passes the current three-dimensional location of the portion of the user to an artificial reality system that provides virtual content to the user and (2) the artificial reality system modifies at least one virtual component of the artificial reality system to account for the current physical location of the portion of the user.

Example 15: An artificial reality system that includes a radar mechanism comprising a transmitter and at least one receiver. The artificial reality system may also include a signal generator that generates a frequency-modulated radar signal. In addition, the radar system may include a delay mechanism that (1) receives the frequency-modulated radar signal from the signal generator and (2) after a certain period of delay, passes the frequency-modulated radar signal to the transmitter to be transmitted to at least one transponder located on a wearable artificial reality device. Furthermore, the radar system may include at least one processing device communicatively coupled to the receiver, wherein the processing device (2) receives the frequency-modulated radar signal from the signal generator, (2) detects a signal returned to the receiver from the transponder in response to the frequency-modulated radar signal, and (2) calculates a distance between the transponder and the receiver based at least in part on an analysis of the signal returned from the transponder and the frequency-modulated radar signal received from the signal generator.

Example 16: The artificial reality system of Example 15, further comprising an additional wearable artificial reality device that secures at least the transmitter, the receiver, the signal generator, and the delay mechanism.

Example 17: The artificial reality system of Example 16, wherein the receiver comprises a plurality of receivers that are secured to the additional wearable artificial reality device such that each of the plurality of receivers are separated by at least a certain distance.

Example 18: The artificial reality system of any of Examples 15-17, wherein the processing device calculates the distance between the transponder and the receiver based at least in part on calculating a beat frequency that (1) corresponds to a difference between an instantaneous frequency of the frequency-modulated radar signal received at the processing device and an instantaneous frequency of the signal returned from the transponder and (2) is proportional to the distance between the transponder and the receiver.

Example 19: The artificial reality system of Example 18, wherein (1) the frequency-modulated radar signal follows a modulation cycle that comprises an approximately linear sweep between a first frequency and a second frequency and (2) the certain period of delay generated by the delay mechanism causes (A) the transmitter to receive the frequency-modulated radar signal at a different point in the modulation cycle than the processing device and (B) the instantaneous frequency of the frequency-modulated radar signal received by the processing device to be offset by a certain amount relative to an instantaneous frequency of the frequency-modulated radar signal transmitted by the transmitter.

Example 20: A method for radar-based artificial reality tracking may include (1) generating a frequency-modulated radar signal, (2) passing the frequency-modulated radar signal to (A) a processing device communicatively coupled to a receiver and (B) a delay mechanism that, after a certain period of delay, passes the frequency-modulated radar signal to a transmitter to be transmitted to at least one transponder located on a wearable artificial reality device, (3) detecting a signal returned to the receiver from the transponder in response to the frequency-modulated radar signal, and (4) calculating a distance between the transponder and the receiver based at least in part on an analysis of the signal returned from the transponder and the frequency-modulated radar signal received at the processing device.

Embodiments of the present disclosure may include or be implemented in conjunction with various types of artificial-reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs). Other artificial-reality systems may include an NED that also provides visibility into the real world (such as, e.g., augmented-reality system 1400 in FIG. 14) or that visually immerses a user in an artificial reality (such as, e.g., virtual-reality system 1500 in FIG. 15). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 14:
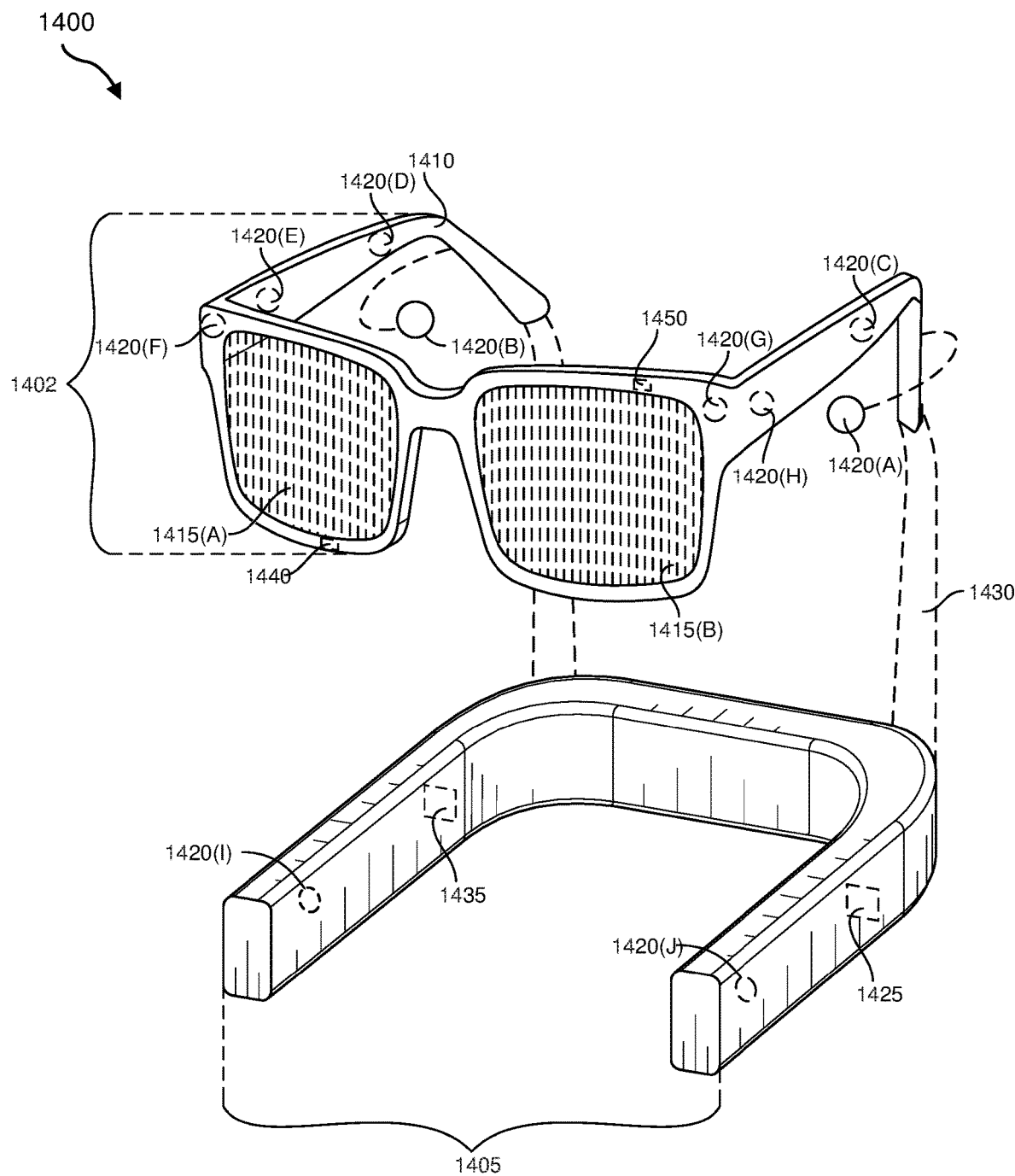
FIG. 14 is an illustration of exemplary augmented-reality glasses that may be used in connection with embodiments of this disclosure.

Turning to FIG. 14, augmented-reality system 1400 may include an eyewear device 1402 with a frame 1410 configured to hold a left display device 1415(A) and a right display device 1415(B) in front of a user's eyes. Display devices 1415(A) and 1415(B) may act together or independently to present an image or series of images to a user. While augmented-reality system 1400 includes two displays, embodiments of this disclosure may be implemented in augmented-reality systems with a single NED or more than two NEDs.

In some embodiments, augmented-reality system 1400 may include one or more sensors, such as sensor 1440. Sensor 1440 may generate measurement signals in response to motion of augmented-reality system 1400 and may be located on substantially any portion of frame 1410. Sensor 1440 may represent one or more of a variety of different sensing mechanisms, such as a position sensor, an inertial measurement unit (IMU), a depth camera assembly, a structured light emitter and/or detector, or any combination thereof. In some embodiments, augmented-reality system 1400 may or may not include sensor 1440 or may include more than one sensor. In embodiments in which sensor 1440 includes an IMU, the IMU may generate calibration data based on measurement signals from sensor 1440. Examples of sensor 1440 may include, without limitation, accelerometers, gyroscopes, magnetometers, other suitable types of sensors that detect motion, sensors used for error correction of the IMU, or some combination thereof.

In some examples, augmented-reality system 1400 may also include a microphone array with a plurality of acoustic transducers 1420(A)-1420(J), referred to collectively as acoustic transducers 1420. Acoustic transducers 1420 may represent transducers that detect air pressure variations induced by sound waves. Each acoustic transducer 1420 may be configured to detect sound and convert the detected sound into an electronic format (e.g., an analog or digital format). The microphone array in FIG. 15 may include, for example, ten acoustic transducers: 1420(A) and 1420(B), which may be designed to be placed inside a corresponding ear of the user, acoustic transducers 1420(C), 1420(D), 1420(E), 1420(F), 1420(G), and 1420(H), which may be positioned at various locations on frame 1410, and/or acoustic transducers 1420(I) and 1420(J), which may be positioned on a corresponding neckband 1405.

In some embodiments, one or more of acoustic transducers 1420(A)-(F) may be used as output transducers (e.g., speakers). For example, acoustic transducers 1420(A) and/or 1420(B) may be earbuds or any other suitable type of headphone or speaker.

The configuration of acoustic transducers 1420 of the microphone array may vary. While augmented-reality system 1400 is shown in FIG. 14 as having ten acoustic transducers 1420, the number of acoustic transducers 1420 may be greater or less than ten. In some embodiments, using higher numbers of acoustic transducers 1420 may increase the amount of audio information collected and/or the sensitivity and accuracy of the audio information. In contrast, using a lower number of acoustic transducers 1420 may decrease the computing power required by an associated controller 1450 to process the collected audio information. In addition, the position of each acoustic transducer 1420 of the microphone array may vary. For example, the position of an acoustic transducer 1420 may include a defined position on the user, a defined coordinate on frame 1410, an orientation associated with each acoustic transducer 1420, or some combination thereof.

Acoustic transducers 1420(A) and 1420(B) may be positioned on different parts of the user's ear, such as behind the pinna, behind the tragus, and/or within the auricle or fossa.

Or, there may be additional acoustic transducers 1420 on or surrounding the ear in addition to acoustic transducers 1420 inside the ear canal. Having an acoustic transducer 1420 positioned next to an ear canal of a user may enable the microphone array to collect information on how sounds arrive at the ear canal. By positioning at least two of acoustic transducers 1420 on either side of a user's head (e.g., as binaural microphones), augmented-reality device 1400 may simulate binaural hearing and capture a 3D stereo sound field around about a user's head. In some embodiments, acoustic transducers 1420(A) and 1420(B) may be connected to augmented-reality system 1400 via a wired connection 1430, and in other embodiments acoustic transducers 1420(A) and 1420(B) may be connected to augmented-reality system 1400 via a wireless connection (e.g., a Bluetooth connection). In still other embodiments, acoustic transducers 1420(A) and 1420(B) may not be used at all in conjunction with augmented-reality system 1400.

Acoustic transducers 1420 on frame 1410 may be positioned in a variety of different ways, including along the length of the temples, across the bridge, above or below display devices 1415(A) and 1415(B), or some combination thereof. Acoustic transducers 1420 may also be oriented such that the microphone array is able to detect sounds in a wide range of directions surrounding the user wearing the augmented-reality system 1400. In some embodiments, an optimization process may be performed during manufacturing of augmented-reality system 1400 to determine relative positioning of each acoustic transducer 1420 in the microphone array.

In some examples, augmented-reality system 1400 may include or be connected to an external device (e.g., a paired device), such as neckband 1405. Neckband 1405 generally represents any type or form of paired device. Thus, the following discussion of neckband 1405 may also apply to various other paired devices, such as charging cases, smart watches, smart phones, wrist bands, other wearable devices, hand-held controllers, tablet computers, laptop computers, other external compute devices, etc.

As shown, neckband 1405 may be coupled to eyewear device 1402 via one or more connectors. The connectors may be wired or wireless and may include electrical and/or non-electrical (e.g., structural) components. In some cases, eyewear device 1402 and neckband 1405 may operate independently without any wired or wireless connection between them. While FIG. 14 illustrates the components of eyewear device 1402 and neckband 1405 in example locations on eyewear device 1402 and neckband 1405, the components may be located elsewhere and/or distributed differently on eyewear device 1402 and/or neckband 1405. In some embodiments, the components of eyewear device 1402 and neckband 1405 may be located on one or more additional peripheral devices paired with eyewear device 1402, neckband 1405, or some combination thereof.

Pairing external devices, such as neckband 1405, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 1400 may be provided by a paired device or shared between a paired device and an eyewear device, thus reducing the weight, heat profile, and form factor of the eyewear device overall while still retaining desired functionality. For example, neckband 1405 may allow components that would otherwise be included on an eyewear device to be included in neckband 1405 since users may tolerate a heavier weight load on their shoulders than they would tolerate on their heads. Neckband 1405 may also have a larger surface area over which to diffuse and disperse heat to the ambient environment. Thus, neckband 1405 may allow for greater battery and computation capacity than might otherwise have been possible on a stand-alone eyewear device. Since weight carried in neckband 1405 may be less invasive to a user than weight carried in eyewear device 1402, a user may tolerate wearing a lighter eyewear device and carrying or wearing the paired device for greater lengths of time than a user would tolerate wearing a heavy standalone eyewear device, thereby enabling users to more fully incorporate artificial-reality environments into their day-to-day activities.

Neckband 1405 may be communicatively coupled with eyewear device 1402 and/or to other devices. These other devices may provide certain functions (e.g., tracking, localizing, depth mapping, processing, storage, etc.) to augmented-reality system 1400. In the embodiment of FIG. 14, neckband 1405 may include two acoustic transducers (e.g., 1420(I) and 1420(J)) that are part of the microphone array (or potentially form their own microphone subarray). Neckband 1405 may also include a controller 1425 and a power source 1435.

Acoustic transducers 1420(I) and 1420(J) of neckband 1405 may be configured to detect sound and convert the detected sound into an electronic format (analog or digital). In the embodiment of FIG. 14, acoustic transducers 1420(I) and 1420(J) may be positioned on neckband 1405, thereby increasing the distance between the neckband acoustic transducers 1420(I) and 1420(J) and other acoustic transducers 1420 positioned on eyewear device 1402. In some cases, increasing the distance between acoustic transducers 1420 of the microphone array may improve the accuracy of beamforming performed via the microphone array. For example, if a sound is detected by acoustic transducers 1420(C) and 1420(D) and the distance between acoustic transducers 1420(C) and 1420(D) is greater than, e.g., the distance between acoustic transducers 1420(D) and 1420(E), the determined source location of the detected sound may be more accurate than if the sound had been detected by acoustic transducers 1420(D) and 1420(E).

Controller 1425 of neckband 1405 may process information generated by the sensors on neckband 1405 and/or augmented-reality system 1400. For example, controller 1425 may process information from the microphone array that describes sounds detected by the microphone array. For each detected sound, controller 1425 may perform a direction-of-arrival (DOA) estimation to estimate a direction from which the detected sound arrived at the microphone array. As the microphone array detects sounds, controller 1425 may populate an audio data set with the information. In embodiments in which augmented-reality system 1400 includes an inertial measurement unit, controller 1425 may compute all inertial and spatial calculations from the IMU located on eyewear device 1402. A connector may convey information between augmented-reality system 1400 and neckband 1405 and between augmented-reality system 1400 and controller 1425. The information may be in the form of optical data, electrical data, wireless data, or any other transmittable data form. Moving the processing of information generated by augmented-reality system 1400 to neckband 1405 may reduce weight and heat in eyewear device 1402, making it more comfortable to the user.

Power source 1435 in neckband 1405 may provide power to eyewear device 1402 and/or to neckband 1405. Power source 1435 may include, without limitation, lithium ion batteries, lithium-polymer batteries, primary lithium batteries, alkaline batteries, or any other form of power storage. In some cases, power source 1435 may be a wired power source. Including power source 1435 on neckband 1405 instead of on eyewear device 1402 may help better distribute the weight and heat generated by power source 1435.

As noted, some artificial-reality systems may, instead of blending an artificial reality with actual reality, substantially replace one or more of a user's sensory perceptions of the real world with a virtual experience. One example of this type of system is a head-worn display system, such as virtual-reality system 1500 in FIG. 15, that mostly or completely covers a user's field of view. Virtual-reality system 1500 may include a front rigid body 1502 and a band 1504 shaped to fit around a user's head. Virtual-reality system 1500 may also include output audio transducers 1506(A) and 1506(B). Furthermore, while not shown in FIG. 15, front rigid body 1502 may include one or more electronic elements, including one or more electronic displays, one or more inertial measurement units (IMUS), one or more tracking emitters or detectors, and/or any other suitable device or system for creating an artificial-reality experience.

Artificial-reality systems may include a variety of types of visual feedback mechanisms. For example, display devices in augmented-reality system 1400 and/or virtual-reality system 1500 may include one or more liquid crystal displays (LCDs), light emitting diode (LED) displays, organic LED (OLED) displays, digital light project (DLP) micro-displays, liquid crystal on silicon (LCoS) micro-displays, and/or any other suitable type of display screen. These artificial-reality systems may include a single display screen for both eyes or may provide a display screen for each eye, which may allow for additional flexibility for varifocal adjustments or for correcting a user's refractive error. Some of these artificial-reality systems may also include optical subsystems having one or more lenses (e.g., conventional concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some the artificial-reality systems described herein may include one or more projection systems. For example, display devices in augmented-reality system 1400 and/or virtual-reality system 1500 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

The artificial-reality systems described herein may also include various types of computer vision components and subsystems. For example, augmented-reality system 1400 and/or virtual-reality system 1500 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

The artificial-reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the artificial-reality systems described herein may also include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial-reality experience in one or more of these contexts and environments and/or in other contexts and environments.

Some augmented-reality systems may map a user's and/or device's environment using techniques referred to as "simultaneous location and mapping" (SLAM). SLAM mapping and location identifying techniques may involve a variety of hardware and software tools that can create or update a map of an environment while simultaneously keeping track of a user's location within the mapped environment. SLAM may use many different types of sensors to create a map and determine a user's position within the map.

SLAM techniques may, for example, implement optical sensors to determine a user's location. Radios including WiFi, Bluetooth, global positioning system (GPS), cellular or other communication devices may be also used to determine a user's location relative to a radio transceiver or group of transceivers (e.g., a WiFi router or group of GPS satellites). Acoustic sensors such as microphone arrays or 2D or 3D sonar sensors may also be used to determine a user's location within an environment. Augmented-reality and virtual-reality devices (such as systems 1400 and 1500 of FIGS. 14 and 15, respectively) may incorporate any or all of these types of sensors to perform SLAM operations such as creating and continually updating maps of the user's current environment. In at least some of the embodiments described herein, SLAM data generated by these sensors may be referred to as "environmental data" and may indicate a user's current environment. This data may be stored in a local or remote data store (e.g., a cloud data store) and may be provided to a user's AR/VR device on demand.

As noted, artificial-reality systems 1400 and 1500 may be used with a variety of other types of devices to provide a more compelling artificial-reality experience. These devices may be haptic interfaces with transducers that provide haptic feedback and/or that collect haptic information about a user's interaction with an environment. The artificial-reality systems disclosed herein may include various types of haptic interfaces that detect or convey various types of haptic information, including tactile feedback (e.g., feedback that a user detects via nerves in the skin, which may also be referred to as cutaneous feedback) and/or kinesthetic feedback (e.g., feedback that a user detects via receptors located in muscles, joints, and/or tendons).

Figure 16:
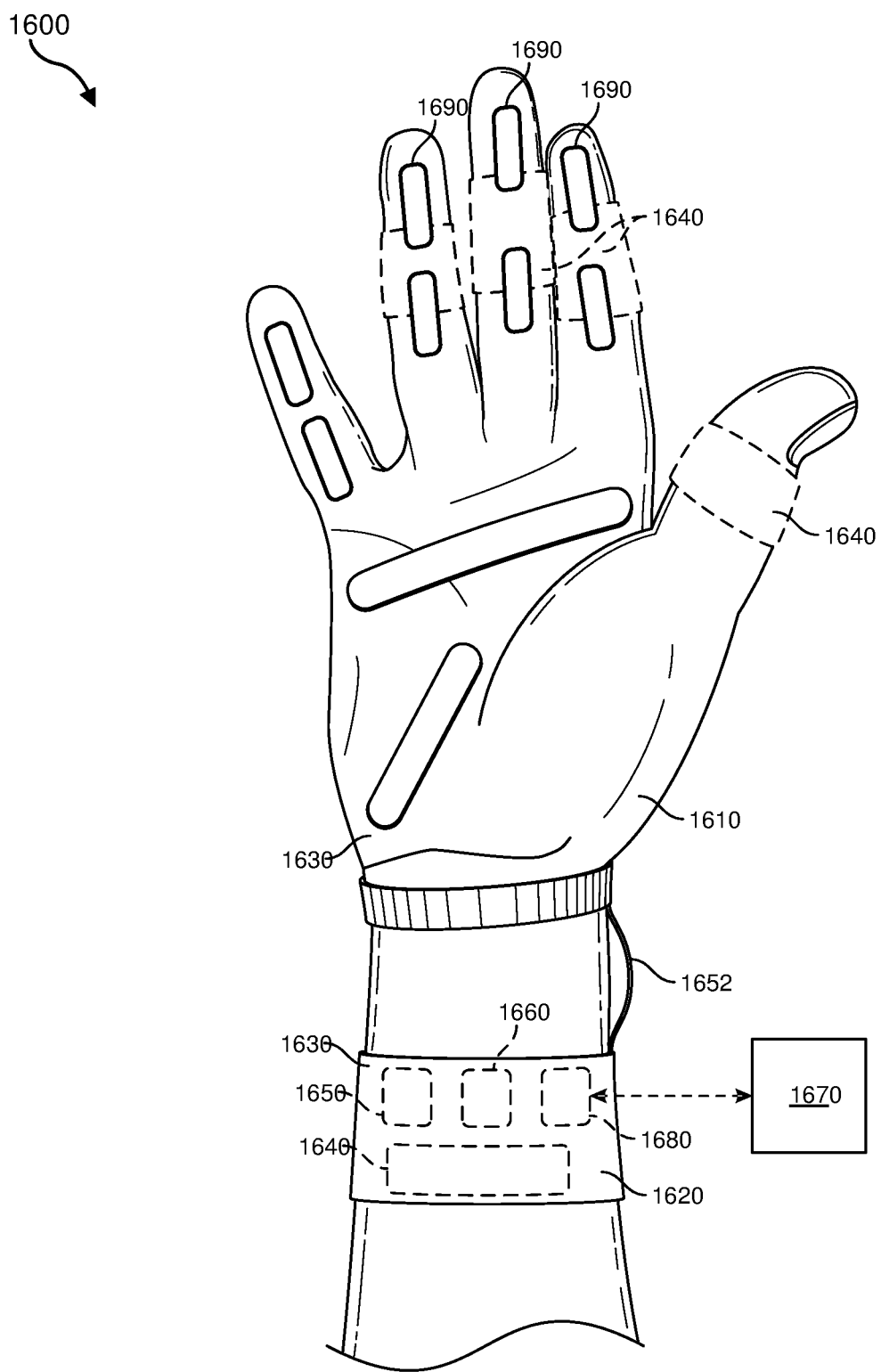
FIG. 16 is an illustration of exemplary haptic devices that may be used in connection with embodiments of this disclosure.

Haptic feedback may be provided by interfaces positioned within a user's environment (e.g., chairs, tables, floors, etc.) and/or interfaces on articles that may be worn or carried by a user (e.g., gloves, wristbands, etc.). As an example, FIG. 16 illustrates a vibrotactile system 1600 in the form of a wearable glove (haptic device 1610) and wristband (haptic device 1620). Haptic device 1610 and haptic device 1620 are shown as examples of wearable devices that include a flexible, wearable textile material 1630 that is shaped and configured for positioning against a user's hand and wrist, respectively. This disclosure also includes vibrotactile systems that may be shaped and configured for positioning against other human body parts, such as a finger, an arm, a head, a torso, a foot, or a leg. By way of example and not limitation, vibrotactile systems according to various embodiments of the present disclosure may also be in the form of a glove, a headband, an armband, a sleeve, a head covering, a sock, a shirt, or pants, among other possibilities. In some examples, the term "textile" may include any flexible, wearable material, including woven fabric, nonwoven fabric, leather, cloth, a flexible polymer material, composite materials, etc.

One or more vibrotactile devices 1640 may be positioned at least partially within one or more corresponding pockets formed in textile material 1630 of vibrotactile system 1600. Vibrotactile devices 1640 may be positioned in locations to provide a vibrating sensation (e.g., haptic feedback) to a user of vibrotactile system 1600. For example, vibrotactile devices 1640 may be positioned against the user's finger(s), thumb, or wrist, as shown in FIG. 16. Vibrotactile devices 1640 may, in some examples, be sufficiently flexible to conform to or bend with the user's corresponding body part(s).

A power source 1650 (e.g., a battery) for applying a voltage to the vibrotactile devices 1640 for activation thereof may be electrically coupled to vibrotactile devices 1640, such as via conductive wiring 1652. In some examples, each of vibrotactile devices 1640 may be independently electrically coupled to power source 1650 for individual activation. In some embodiments, a processor 1660 may be operatively coupled to power source 1650 and configured (e.g., programmed) to control activation of vibrotactile devices 1640.

Vibrotactile system 1600 may be implemented in a variety of ways. In some examples, vibrotactile system 1600 may be a standalone system with integral subsystems and components for operation independent of other devices and systems. As another example, vibrotactile system 1600 may be configured for interaction with another device or system 1670. For example, vibrotactile system 1600 may, in some examples, include a communications interface 1680 for receiving and/or sending signals to the other device or system 1670. The other device or system 1670 may be a mobile device, a gaming console, an artificial-reality (e.g., virtual-reality, augmented-reality, mixed-reality) device, a personal computer, a tablet computer, a network device (e.g., a modem, a router, etc.), a handheld controller, etc. Communications interface 1680 may enable communications between vibrotactile system 1600 and the other device or system 1670 via a wireless (e.g., Wi-Fi, Bluetooth, cellular, radio, etc.) link or a wired link. If present, communications interface 1680 may be in communication with processor 1660, such as to provide a signal to processor 1660 to activate or deactivate one or more of the vibrotactile devices 1640.

Vibrotactile system 1600 may optionally include other subsystems and components, such as touch-sensitive pads 1690, pressure sensors, motion sensors, position sensors, lighting elements, and/or user interface elements (e.g., an on/off button, a vibration control element, etc.). During use, vibrotactile devices 1640 may be configured to be activated for a variety of different reasons, such as in response to the user's interaction with user interface elements, a signal from the motion or position sensors, a signal from the touch-sensitive pads 1690, a signal from the pressure sensors, a signal from the other device or system 1670, etc.

Although power source 1650, processor 1660, and communications interface 1680 are illustrated in FIG. 16 as being positioned in haptic device 1620, the present disclosure is not so limited. For example, one or more of power source 1650, processor 1660, or communications interface 1680 may be positioned within haptic device 1610 or within another wearable textile.

Figure 17:
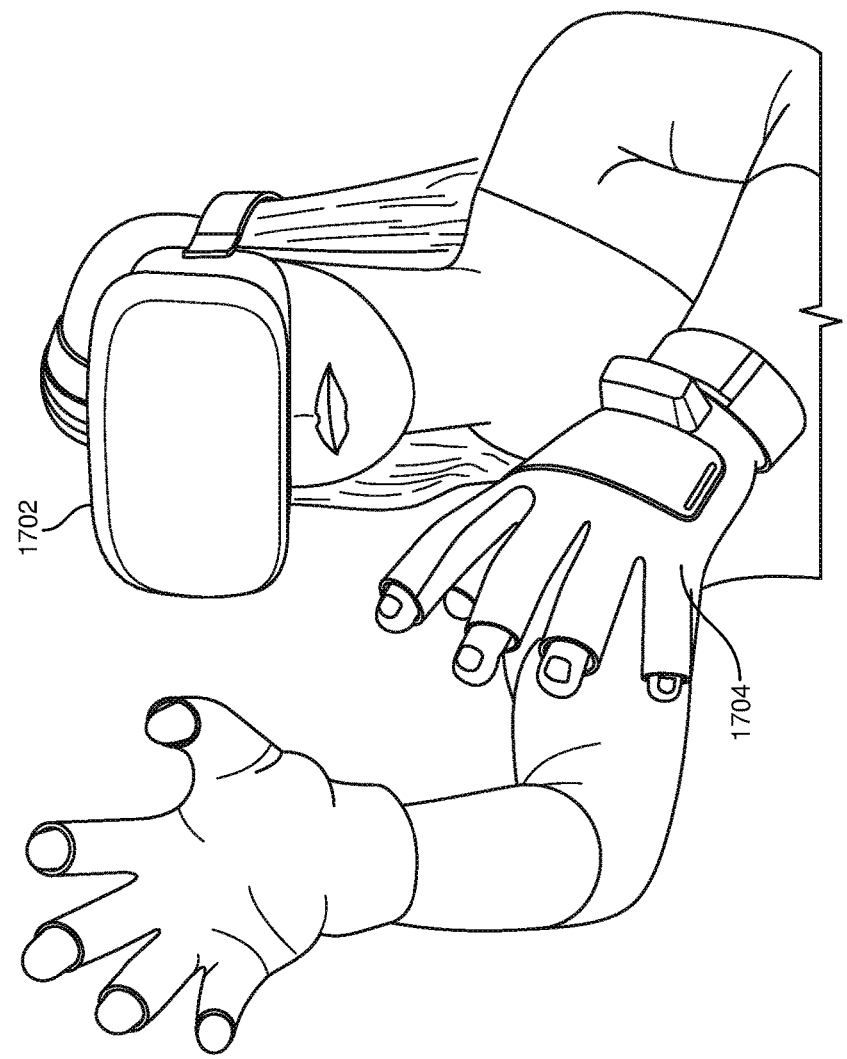
FIG. 17 is an illustration of an exemplary virtual-reality environment according to embodiments of this disclosure.

Haptic wearables, such as those shown in and described in connection with FIG. 16, may be implemented in a variety of types of artificial-reality systems and environments. FIG. 17 shows an example artificial-reality environment 1700 including one head-mounted virtual-reality display and two haptic devices (i.e., gloves), and in other embodiments any number and/or combination of these components and other components may be included in an artificial-reality system. For example, in some embodiments there may be multiple head-mounted displays each having an associated haptic device, with each head-mounted display and each haptic device communicating with the same console, portable computing device, or other computing system.

Figure 15:
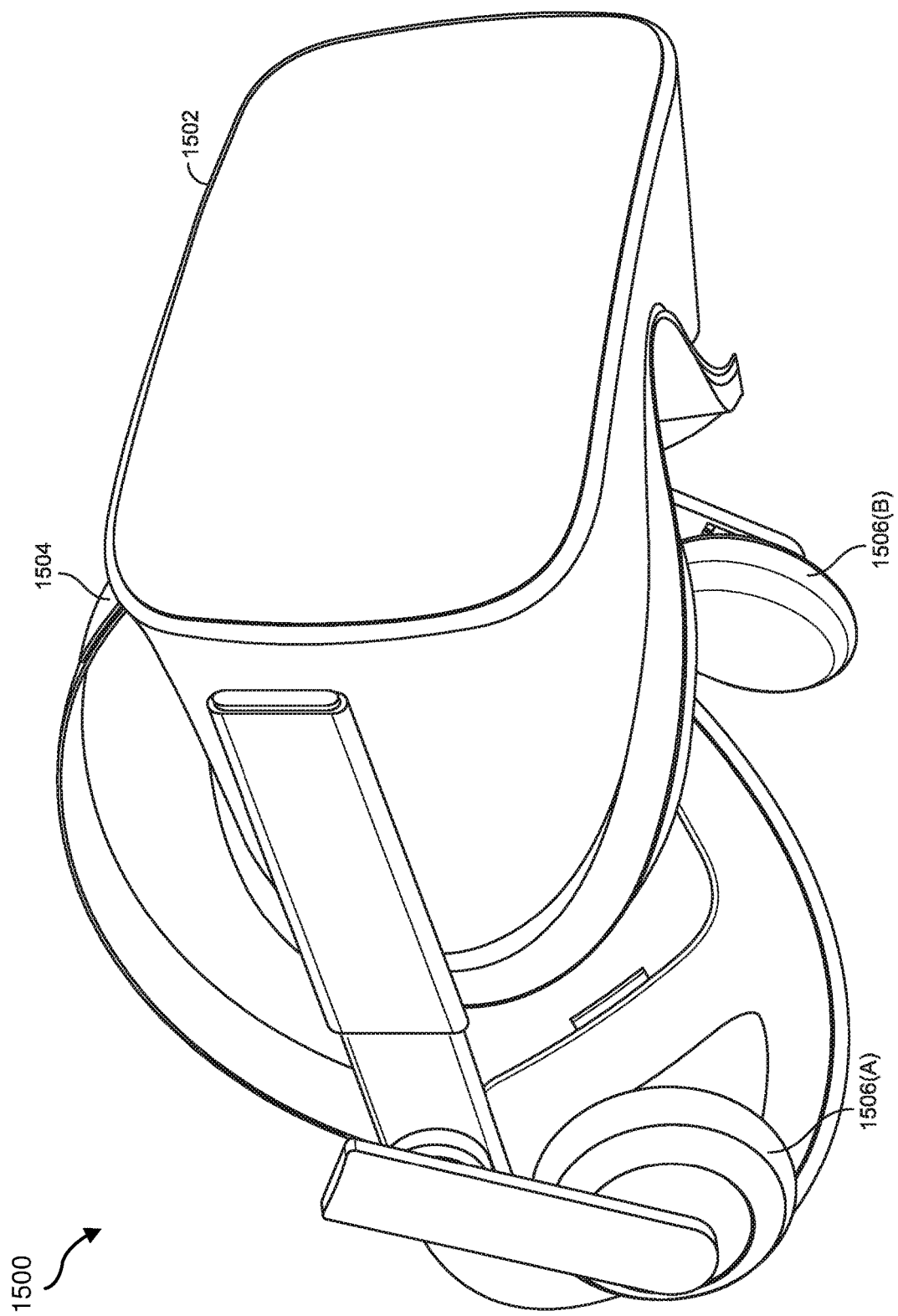
FIG. 15 is an illustration of an exemplary virtual-reality headset that may be used in connection with embodiments of this disclosure.

Head-mounted display 1702 generally represents any type or form of virtual-reality system, such as virtual-reality system 1500 in FIG. 15. Haptic device 1704 generally represents any type or form of wearable device, worn by a user of an artificial-reality system, that provides haptic feedback to the user to give the user the perception that he or she is physically engaging with a virtual object. In some embodiments, haptic device 1704 may provide haptic feedback by applying vibration, motion, and/or force to the user. For example, haptic device 1704 may limit or augment a user's movement. To give a specific example, haptic device 1704 may limit a user's hand from moving forward so that the user has the perception that his or her hand has come in physical contact with a virtual wall. In this specific example, one or more actuators within the haptic device may achieve the physical-movement restriction by pumping fluid into an inflatable bladder of the haptic device. In some examples, a user may also use haptic device 1704 to send action requests to a console. Examples of action requests include, without limitation, requests to start an application and/or end the application and/or requests to perform a particular action within the application.

Figure 18:
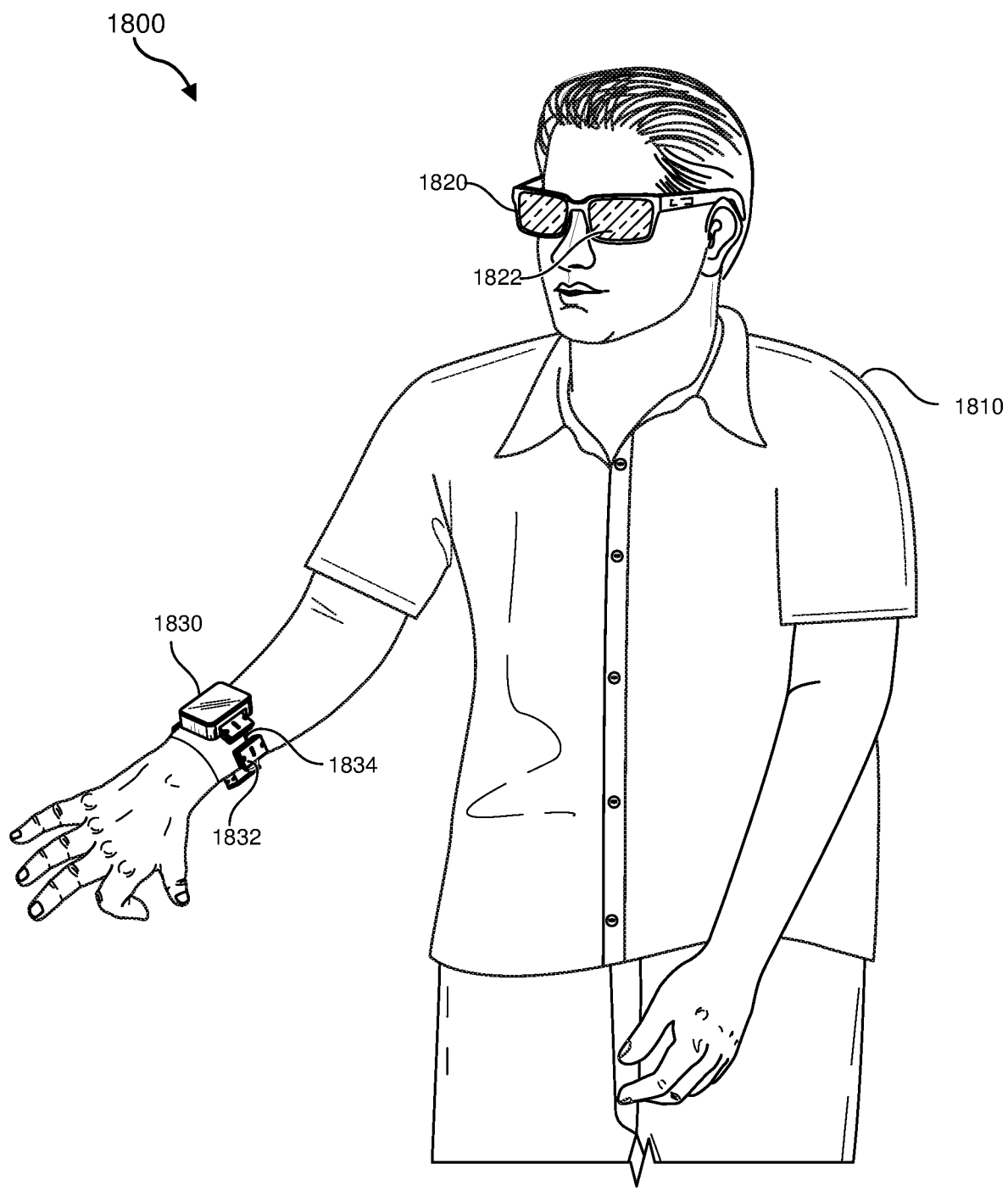
FIG. 18 is an illustration of an exemplary augmented-reality environment according to embodiments of this disclosure.

While haptic interfaces may be used with virtual-reality systems, as shown in FIG. 17, haptic interfaces may also be used with augmented-reality systems, as shown in FIG. 18. FIG. 18 is a perspective view of a user 1810 interacting with an augmented-reality system 1800. In this example, user 1810 may wear a pair of augmented-reality glasses 1820 that may have one or more displays 1822 and that are paired with a haptic device 1830. In this example, haptic device 1830 may be a wristband that includes a plurality of band elements 1832 and a tensioning mechanism 1834 that connects band elements 1832 to one another.

One or more of band elements 1832 may include any type or form of actuator suitable for providing haptic feedback. For example, one or more of band elements 1832 may be configured to provide one or more of various types of cutaneous feedback, including vibration, force, traction, texture, and/or temperature. To provide such feedback, band elements 1832 may include one or more of various types of actuators. In one example, each of band elements 1832 may include a vibrotactor (e.g., a vibrotactile actuator) configured to vibrate in unison or independently to provide one or more of various types of haptic sensations to a user. Alternatively, only a single band element or a subset of band elements may include vibrotactors.

Haptic devices 1610, 1620, 1704, and 1830 may include any suitable number and/or type of haptic transducer, sensor, and/or feedback mechanism. For example, haptic devices 1610, 1620, 1704, and 1830 may include one or more mechanical transducers, piezoelectric transducers, and/or fluidic transducers. Haptic devices 1610, 1620, 1704, and 1830 may also include various combinations of different types and forms of transducers that work together or independently to enhance a user's artificial-reality experience. In one example, each of band elements 1832 of haptic device 1830 may include a vibrotactor (e.g., a vibrotactile actuator) configured to vibrate in unison or independently to provide one or more of various types of haptic sensations to a user.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A radar system comprising:
   a radar mechanism comprising at least one transmitter and at least one receiver;
   a signal generator that generates a frequency-modulated radar signal;
   a delay mechanism that:
      receives the frequency-modulated radar signal from the signal generator; and
      after a certain period of delay, passes the frequency-modulated radar signal to the transmitter to be transmitted to at least one transponder located on a wearable artificial reality device; and
   at least one processing device communicatively coupled to the receiver, wherein the processing device:
      receives the frequency-modulated radar signal from the signal generator;
      detects a signal returned to the receiver from the transponder in response to the frequency-modulated radar signal;
      calculates a beat frequency that:
         corresponds to a difference between an instantaneous frequency of the frequency-modulated radar signal received at the processing device and an instantaneous frequency of the signal returned from the transponder; and
         is proportional to an apparent distance between the transponder and the receiver; and
      calculates a distance between the transponder and the receiver based at least in part on:
         an analysis of the signal returned from the transponder and the frequency-modulated radar signal received from the signal generator; and
         the beat frequency.

2. The radar system of claim 1, further comprising an additional wearable artificial reality device that secures at least:
   the transponder;
   the receiver;
   the signal generator; and
   the delay mechanism.

3. The radar system of claim 2, wherein the receiver comprises a plurality of receivers that are secured to the additional wearable artificial reality device such that each of the plurality of receivers are separated by at least a certain distance.

4. The radar system of claim 1, wherein:
   the frequency-modulated radar signal follows a modulation cycle that comprises an approximately linear sweep between a first frequency and a second frequency; and
   the certain period of delay generated by the delay mechanism causes:

the transmitter to receive the frequency-modulated radar signal at a different point in the modulation cycle than the processing device; and the instantaneous frequency of the frequency-modulated radar signal received by the processing device to be offset by a certain amount relative to an instantaneous frequency of the frequency-modulated radar signal transmitted by the transmitter.

5. The radar system of claim 4, wherein offsetting the instantaneous frequency of the frequency-modulated radar signal transmitted by the transmitter increases the beat frequency by a certain value such that the apparent distance between the transponder and the receiver exceeds the distance between the transponder and the receiver by a certain length.

6. The radar system of claim 5, wherein the processing device accounts for the increase in the beat frequency by the certain amount while calculating the distance between the transponder and the receiver.

7. The radar system of claim 1, wherein the delay mechanism comprises a fiber optic cable that transmits the frequency-modulated radar signal from the signal generator to the transmitter.

8. The radar system of claim 7, wherein a length of the fiber optic cable is selected such that the frequency-modulated radar signal traverses along the fiber optic cable for an amount of time corresponding to the certain period of delay.

9. The radar system of claim 1, wherein the delay mechanism comprises at least one of:
a coaxial cable;
delay line; or
light-emitting diode.

10. The radar system of claim 1, further comprising a frequency multiplier positioned between the delay mechanism and the transmitter.

11. The radar system of claim 10, wherein the frequency multiplier:
receives the frequency-modulated radar signal from the delay mechanism; and
passes the frequency-modulated radar signal to the transmitter after multiplying a frequency of the frequency-modulated radar signal by a certain factor.

12. The radar system of claim 1, wherein the processing device further determines, based at least in part on the distance between the transponder and the receiver, a current three-dimensional location of at least a portion of a user wearing the wearable artificial reality device.

13. The radar system of claim 12, wherein:
the processing device further passes the current three-dimensional location of the portion of the user to an artificial reality system that provides virtual content to the user; and
the artificial reality system modifies at least one virtual component of the artificial reality system to account for the current three-dimensional location of the portion of the user.

14. An artificial reality system comprising:
a radar mechanism comprising at least one transmitter and at least one receiver;
a signal generator that generates a frequency-modulated radar signal;
a delay mechanism that:
receives the frequency-modulated radar signal from the signal generator; and
after a certain period of delay, passes the frequency-modulated radar signal to the transmitter to be transmitted to at least one transponder located on a wearable artificial reality device; and
at least one processing device communicatively coupled to the receiver, wherein the processing device:
receives the frequency-modulated radar signal from the signal generator;
detects a signal returned to the receiver from the transponder in response to the frequency-modulated radar signal;
calculates a beat frequency that:
corresponds to a difference between an instantaneous frequency of the frequency-modulated radar signal received at the processing device and an instantaneous frequency of the signal returned from the transponder; and
is proportional to an apparent distance between the transponder and the receiver; and
calculates a distance between the transponder and the receiver based at least in part on:
an analysis of the signal returned from the transponder and the frequency-modulated radar signal received from the signal generator; and
the beat frequency.

15. The artificial reality system of claim 14, further comprising an additional wearable artificial reality device that secures at least:
the transponder;
the receiver;
the signal generator; and
the delay mechanism.

16. The artificial reality system of claim 15, wherein the receiver comprises a plurality of receivers that are secured to the additional wearable artificial reality device such that each of the plurality of receivers are separated by at least a certain distance.

17. The artificial reality system of claim 14, wherein:
the frequency-modulated radar signal follows a modulation cycle that comprises sweeping linearly between a first frequency and a second frequency; and
the certain period of delay generated by the delay mechanism causes:
the transmitter to receive the frequency-modulated radar signal at a different point in the modulation cycle than the processing device; and
the instantaneous frequency of the frequency-modulated radar signal received by the processing device to be offset by a certain amount relative to an instantaneous frequency of the frequency-modulated radar signal transmitted by the transmitter.

18. A method comprising:
generating a frequency-modulated radar signal;
passing the frequency-modulated radar signal to:
a processing device communicatively coupled to a receiver; and
a delay mechanism that, after a certain period of delay, passes the frequency-modulated radar signal to a transmitter to be transmitted to at least one transponder located on a wearable artificial reality device;
detecting a signal returned to the receiver from the transponder in response to the frequency-modulated radar signal; and
calculating a beat frequency that:
corresponds to a difference between an instantaneous frequency of the frequency-modulated radar signal received at the processing device and an instantaneous frequency of the signal returned from the transponder; and is proportional to an apparent distance between the transponder and the receiver;
calculating a distance between the transponder and the receiver based at least in part on:
an analysis of the signal returned from the transponder and the frequency-modulated radar signal received at the processing device; and
the beat frequency.

* * * * *